(12) United States Patent
Tai

(10) Patent No.: US 11,847,296 B2
(45) Date of Patent: Dec. 19, 2023

(54) METHOD FOR INPUTTING AND SHARING OF OBSERVATION INFORMATION ON THE OBJECT, AND A COMPUTER-READABLE STORAGE MEDIUM

(71) Applicant: HEALTHCARE BANK CO., LTD., Seoul (KR)

(72) Inventor: Joo Ho Tai, Seoul (KR)

(73) Assignee: HEALTHCARE BANK CO., LTD., Seoul (KR)

( * ) Notice: Subject to any disclaimer, the term of this patent is extended or adjusted under 35 U.S.C. 154(b) by 37 days.

(21) Appl. No.: 17/607,016

(22) PCT Filed: Nov. 13, 2020

(86) PCT No.: PCT/KR2020/015952
§ 371 (c)(1),
(2) Date: Oct. 27, 2021

(87) PCT Pub. No.: WO2021/096276
PCT Pub. Date: May 20, 2021

(65) Prior Publication Data
US 2022/0334705 A1 Oct. 20, 2022

(30) Foreign Application Priority Data
Nov. 14, 2019 (KR) ........................ 10-2019-0145528

(51) Int. Cl.
*G06F 3/048* (2013.01)
*G06F 3/04815* (2022.01)
*G06F 3/0482* (2013.01)
*G06F 3/04845* (2022.01)
*G06Q 50/00* (2012.01)
*G06F 3/0488* (2022.01)

(52) U.S. Cl.
CPC ........ *G06F 3/04815* (2013.01); *G06F 3/0482* (2013.01); *G06F 3/04845* (2013.01); *G06Q 50/01* (2013.01); *G06F 3/0488* (2013.01)

(58) Field of Classification Search
None
See application file for complete search history.

(56) References Cited

U.S. PATENT DOCUMENTS

2010/0045696 A1* 2/2010 Bruder ................... A61B 6/466
345/611
2013/0236093 A1* 9/2013 Gatt ...................... G06F 3/0482
382/311
(Continued)

FOREIGN PATENT DOCUMENTS

JP 2013248375 A 12/2013
KR 20050043180 A 5/2005
(Continued)

OTHER PUBLICATIONS

International Search Report of PCT/KR2020/015952, dated Mar. 3, 2021, English translation.

*Primary Examiner* — William C Trapanese
(74) *Attorney, Agent, or Firm* — STIP Law Group, LLC

(57) ABSTRACT

This invention relates to a method for providing the inputting and sharing service of the observation information on an arbitrary object, and a computer-readable storage medium to save the instructions for executing the method.

9 Claims, 24 Drawing Sheets

(a)

(56) References Cited

U.S. PATENT DOCUMENTS

2015/0371422 A1* 12/2015 Kokemohr .............. G06T 11/60
                                                      382/311
2016/0371457 A1* 12/2016 Zillner .................... G16Z 99/00
2017/0156982 A1*  6/2017 Oda ........................ G16H 20/40

FOREIGN PATENT DOCUMENTS

| KR | 20170123368 A   | 11/2017 |
| KR | 20190063595 A   | 6/2019  |
| KR | 102170991 B1    | 10/2020 |
| WO | WO2015174425 A1 | 11/2015 |

* cited by examiner (a)

(b)

FIG. 5 (a)
FIG. 5 (b)
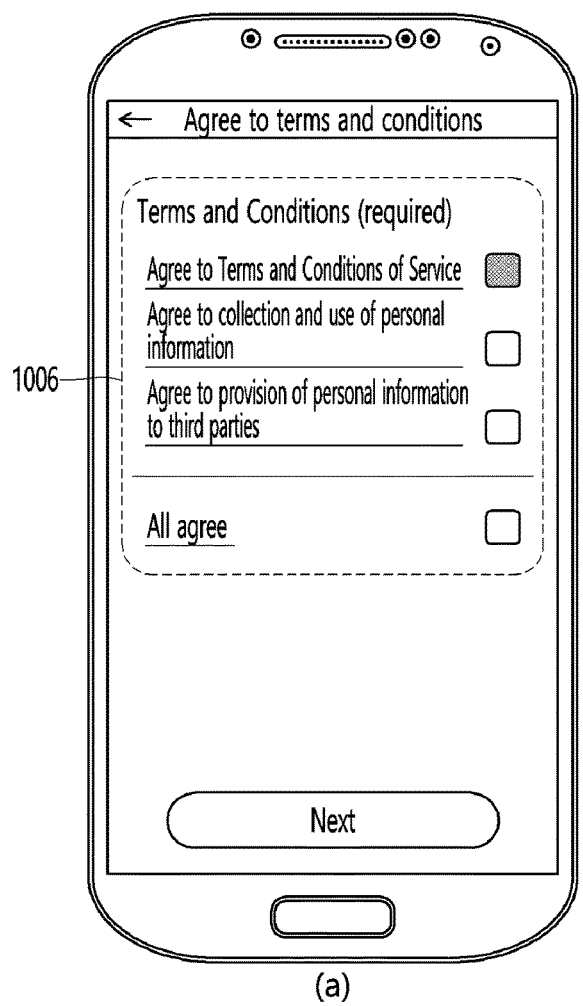
(a)
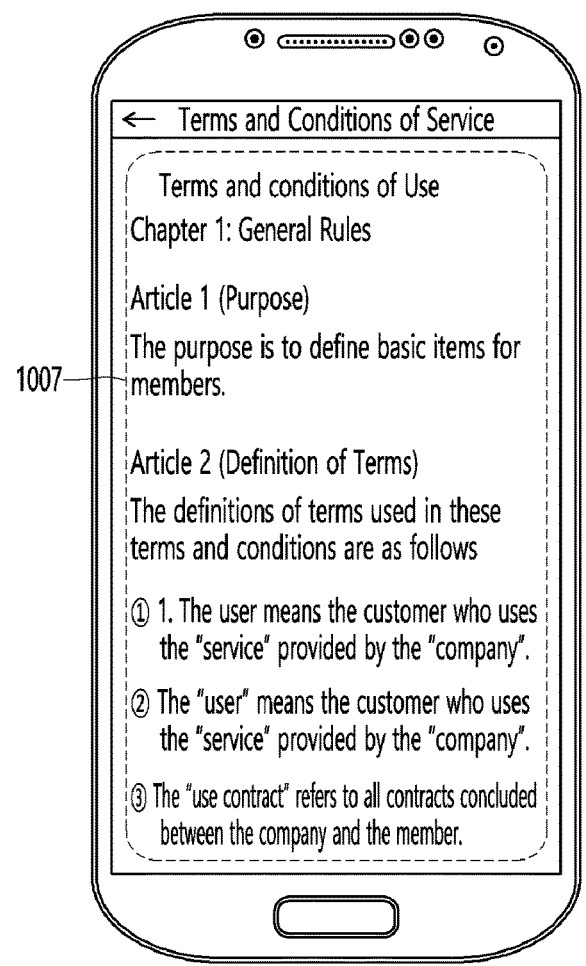
(b)

(a)

(b)

(c)

(a)

(b)

(a)

(b)

(a)

(b)

(a)

(b)

(a)

(b)

FIG. 17 (a)
FIG. 17 (b)
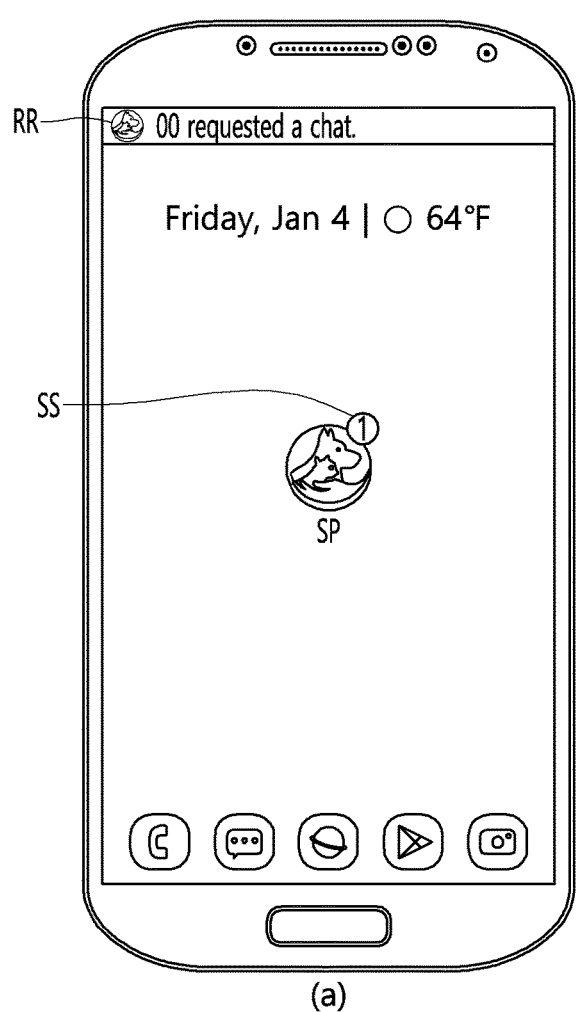
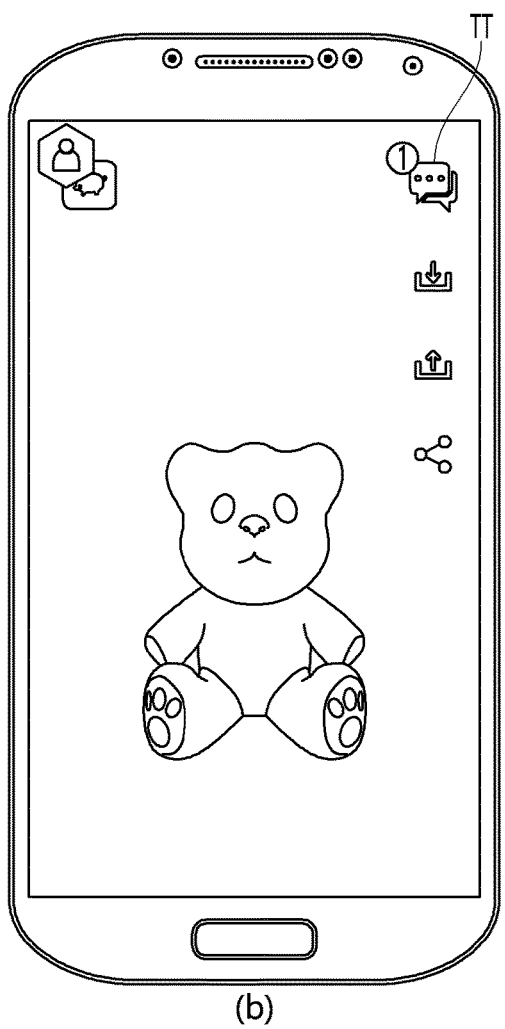
(a)
(b)

(a)

(b)

METHOD FOR INPUTTING AND SHARING OF OBSERVATION INFORMATION ON THE OBJECT, AND A COMPUTER-READABLE STORAGE MEDIUM

A method for inputting and sharing of observation information on the object, and a computer-readable storage medium

CROSS-REFERENCE TO RELATED APPLICATIONS

This application is the U.S. National Phase under 35 U.S.C. § 371 of International Application No. PCT/KR2020/015952 filed on Nov. 13, 2020, which in turn claims the benefit of Korean Application No. 10-2019-0145528 filed on Nov. 14, 2019, the disclosures of which are incorporated by reference into the present application.

TECHNICAL FIELD

This invention is related to a method for inputting and sharing the observation information on an arbitrary object, and a computer-readable storage medium storing the instructions for executing the method.

BACKGROUND TECHNOLOGY

With the rapid development of device and network technology, an environment in which various fields and kinds of information can be shared is being prepared, and demand for sharing such information is continuously increasing according to technological and industrial development.

Meanwhile, there has been a lot of demand for systems and methodologies that can share the observation information on the object, particularly, the health care or medical-related information of an arbitrary object. Even now, various types of information-sharing systems are being proposed.

However, as the most of conventional systems for sharing the observation information are not so graphic-based, it is difficult for the user to understand the information about the object from the view point of the information receiver. Even based on the graphics, the systems are usually based on 2D graphics, making users difficult to intuitively input and understand the information. The rare systems with 3D graphics have also the problems that they are so distracted for users to pay attention, making it difficult to input intuitively due to the composition of many explanations and divided boxes.

This invention is intended to provide an environment for easy sharing of observation information on an arbitrary object. It has a lot of merits: with the 3D-based graphic interface, it helps the users input the observation information in an easy, fast, and fun way, making them focus on the initial intuition immediately before input. For example, its 3-D positioning and related functions which are designed and prepared to be naturally embedded in the input interface of the general users enables them to obtain and accumulate the useful data in various specialized fields (anatomy, pathology, imaging, various diagnostic, bio & clinical activities, climate, agriculture, data science, artificial intelligence, etc.). With these, it can allow bilateral communication of the intuitive observation among general users and experts. Thus, it provides the method for diverse users to communicate and share the information in both directions for its systematical and rational analysis and utilization so that appropriate responses, services and actions are made.

This invention has been designed in consideration of such problems. Not only possible to solve the above technical problems, it can also provide additional technical elements that cannot be easily invented by a person of ordinary skill in this field.

DETAILED DESCRIPTION OF THE INVENTION

Technical Challenges

The purpose of this invention is to provide an interface so that a user can easily input the observation information on an arbitrary object. In detail, it aims to enable the user to input various information on the corresponding 3D model in a state in which an object such as person or animal is implemented in 3D model. In particular, it enables the user to input the information on an arbitrary object as intuitively and accurately as the initial feeling and memory by allowing the user to maintain/concentrate the feeling and memory immediately before inputting it as much as possible.

When there is an observational peculiarity on the object—e.g., the state and degree of the wound, the degree and feeling of pain, etc.—this invention can intuitively and realistically display the presence of abnormality in the external appearance, and digitalize it to record the information cumulatively, allowing the user to easily and clearly understand the extent of improvement or worsening of the object's wounds or symptoms when the information is recalled in the future. It can also help those who are shared with the information to understand the state of the object simply, quickly, accurately, and clearly.

Another purpose of this invention is to make the observed information be shared quickly, accurately, and precisely by outsiders, including external experts (e.g., medical staff) or acquaintances (e.g., family, friends, business owners, etc.). Specifically, when the user executes the information sharing service after entering the observation information for an arbitrary object, the information is transmitted to the person related to health care/health such as a doctor, a veterinarian, or other acquaintances. It helps others to quickly and easily recognize the current state of the object, and to make appropriate and correct responses and guidelines accordingly.

The performance of this invention is not limited to the technical functions mentioned above, and other technical functions will be clearly understood by skilled technicians from the following descriptions.

Technical Solution

In order to solve the information inputting and sharing problems in the conventional methods, this invention has the stages as follows: (a) the stage for a user to enter the information on an object into the system; (b) the stage to load the 3D object model corresponding to the object's information; (c) the stage to receive the observation information on the above-mentioned object model through the first user interface provided when the object model is loaded; and (d) the stage to share the received observation information to other user's terminal through the network.

In the method, the first user interface includes a plurality of observation information input tools for inputting the observation information: the brush input tool to give at least one color on the object model; the text input tool to enter the text for the object model; the photographing input tool to enter a photo or video of the object corresponding to the object model; and the save and upload tool to store and upload the input observation information. The brush input tool, the text input tool, the photographing input tool, and the save and upload tool may be arranged on a bar in the order of one direction.

The brush input tool has two menu sets: the first menu set comprising the menus to select the brush size, to initialize the input, to cancel the input, to go to a next step and to select the color; the second menu set comprising the menus to input the mood level and the activity level of the object. Here, the first menu set is displayed first when the brush input tool is selected by the user, The second menu set is displayed when a next sub-menu is selected in the first menu set, and the first menu set is not displayed when the second menu set is displayed.

The brush input tool, the text input tool, the photographing input tool, and the save and upload tool are sequentially arranged in a downward direction along the left or right side in the screen of the user terminal, and the menu sets or menus corresponding to the respective input tools can be displayed from the same height as each of the input tools.

In addition to above menus, the first user interface includes the information inquiry tool. When this tool is selected by the user, a slide-type information search tool appears to show the accumulated observation information in chronological order from the past to the present.

The first user interface also includes a tool for changing, selecting, or adding the object.

Furthermore, the first user interface comprises a chat initiating tool for executing a chat function. By selecting the chat initiating tool, the user can invite an external expert to share the observation information and receive his/her opinion based on the observation information.

And, in the stage (b) of the above method, the user can load a plurality of object models, wherein at least two object models among the plural models are heterogeneous.

Furthermore, after the stage (c), the user can add the stage converting the 3D object model with the observation information into the 2D model.

On the other hand, the computer-readable storage medium according to another implementation example of this invention can store the commands to perform the observation information inputting and sharing service for an arbitrary object. The method to provide inputting and sharing service includes the steps as follows: (a) the user enters the member information into the system; (b) the user loads the 3D object model corresponding to the object's information; (c) the object model receives the observation information on the object model through the first user interface after it is loaded; and (d) the received observation information is shared to other user's terminals through a network.

Effects of the Invention

This invention has an effect that a user can intuitively and easily enter the observation information about an arbitrary object.

In addition, with this invention, a user can enter the observation information about an object cumulatively using a simple input method. Accordingly, there is an effect that the improvement trend of the object can be easily grasped.

This invention also has an effect of allowing the user to easily grasp the change over time of an object by visualizing the observation information in a time-series manner.

With this invention, the user can also easily share the observation information with external experts and others. Accordingly, the user can quickly receive appropriate instructions from connected colleagues and organizations, as well as diagnosis, first aid, and prescription from medical staffs.

Furthermore, through this invention, the user can easily access the product information and service information corresponding to the inputted observation information or the instructions from external experts. Accordingly, the user can easily purchase the necessary product or service. If the user is a business owner, the marketing effect of a product or service can be maximized through this invention.

The effects of this invention are not limited to those mentioned above, but other technical effects will be clearly understood by skilled technicians from the following description.

BRIEF DESCRIPTION OF DRAWINGS

FIG. 5(a) and FIG. 5 (b) illustrate the screen displaying the terms and conditions for application.

FIG. 9(b) and FIG. 9(c) are for explaining the brush menu.

FIG. 17(a) and FIG. 17(b) illustrate the application screen of a counterpart invited by the user when using a chatting function.

FORMS FOR IMPLEMENTATION OF THE INVENTION

Figure 1:
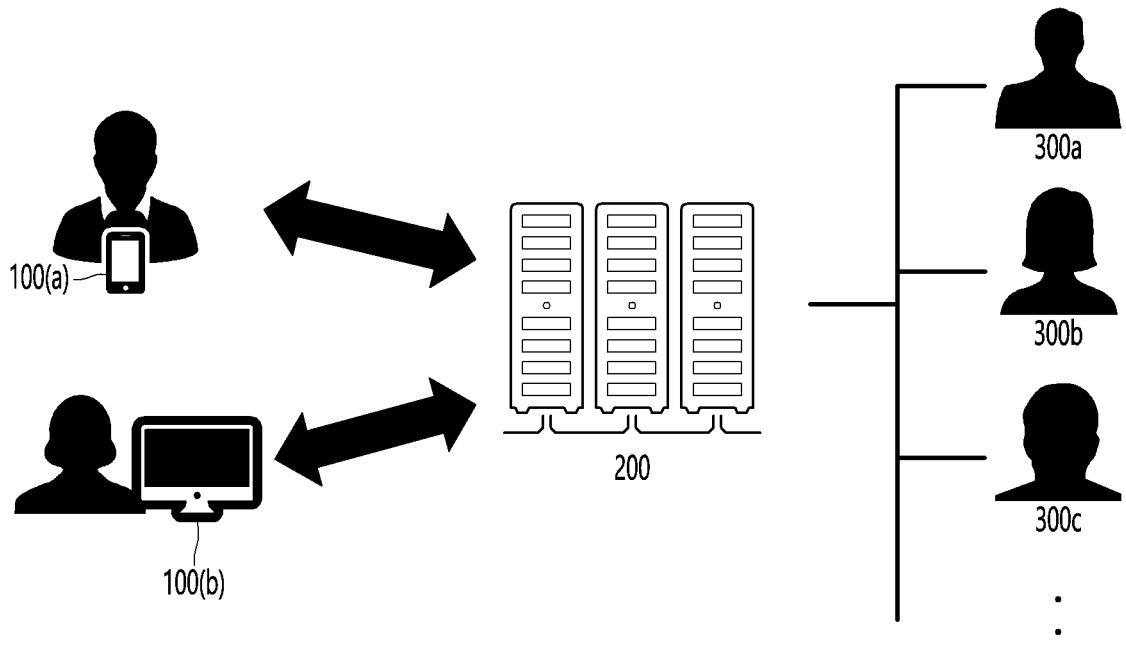
FIG. 1 schematically shows the overall system that can be built for implementing the method according to the invention.

Along with the purpose and technical configuration of this invention, the details regarding its operational effects will be more clearly understood by the following drawings and accompanying description in the specification of this invention. The implementation examples of this invention will be described in detail with reference to the accompanying drawings.

The implementation examples in this specification should not be construed or used as limiting the scope of this invention. It is natural that the description including the implementation examples in this specification will have various applications for those skilled in this field. Accordingly, any examples set forth in the detailed description of this invention are illustrative for better describing this invention and are not intended to limit the scope of this invention to the implementations.

The functional blocks shown in the drawings and described below are merely examples of possible implementations. Other functional blocks may be used in other implementations without deviating from the purpose and scope of the detailed description. Although each functional block of this invention are reckoned as separate, one or more of the functional blocks of this invention may be combinations of various hardware and software that perform the same function.

The expression of "including certain components" just means the "open type" referring to the existence of relevant components, and should not be construed as excluding additional components.

Furthermore, when it is said that an element is "connected to" or "linked to" another element, it should be understood that the two elements may directly connected or linked each other, but other elements may exist between the two.

Before a full-scale explanation, it seems necessary to briefly describe with reference to FIG. 1 in what system environment the method for entering and sharing the observation information according to this invention will be implemented.

FIG. 1 schematically shows the system in which the method of this invention is provided. This system comprises a user terminal(100), a service server(200), and a terminal of external experts(300), which can be connected to the network as shown in FIG. 1. As an easy example to implement the method of this invention, two users (100 (*a*) and (*b*)) raising pets may observe the information on the appearance of their pets as well as their pains, symptoms, or behavior. Each of them can enter their observation information through the user terminal (100), and the observation information about the user himself/herself related thereto may be entered, too. The observation information entered in this way is stored in the service server(200), and the stored information can be shared again with an external expert, for example, a veterinarian or medical staff, from whom the users (100(*a*), 100(*b*)) get the advice. The method implemented in this invention is not only limited to pets such as dogs and cats, but can be applied to humans as referred to in this specification. However, it should be noted in advance that the following descriptions will be carried out on the premise that the object is a pet animal in order to help the understanding of the invention.

Now, the components constituting the system shown in FIG. 1 can be described in detail as follows:

First, the user terminal refers to the terminal possessed or carried by the user, which may include portable terminals such as smart phone, PDA, tablet PC, etc., as well as desk top terminals such as home PC. These user terminals should be provided with a central processing unit (CPU) and a memory. The CPU may also be called as controller, microcontroller, microprocessor, microcomputer or so. The CPU is implemented with hardware, firmware, software, or a combination thereof. When implemented with hardware, it becomes the ASIC(application specific integrated circuit), DSP(digital signal processor), DSPD (digital signal processing device), PLD(programmable logic device) or FPGA (field programmable gate array); when implemented with firmware or software, it comprises the module, procedure or function that performs the above functions or operations, etc. And, the memory can include ROM(Read Only Memory), RAM(Random Access Memory), EPROM(Erasable Programmable Read Only Memory), EEPROM(Electrically Erasable Programmable Read-Only Memory), flash memory, and SRAM (Static RAM), It may work as hard disk drive (HDD), solid state drive (SSD) or so.

In this detailed description, the user terminal (100) is assumed as a smart phone or a tablet PC for easy understanding of this invention. In this case, the user terminal (100) may include a display and a touch-sensitive surface, and, additionally, one or more other means for physical user input such as physical keyboard, mouse and/or joystick. Furthermore, the user terminal (100) may include the means for detecting and recording a sound or voice. Meanwhile, various applications running on the user terminal can optionally use one or more common means for physical input, such as touch-sensitive surface. In addition, the corresponding information displayed on the user terminal is optionally adjustable and/or modifiable from one application to the next application and/or within the object application. In this way, the universal physical architecture (such as a touch-sensitive surface) of the user terminal can optionally support a variety of applications that are intuitive and clear to the user.

The user terminal has been designed to allow a user to easily input the observation information on the object with the user interface in the descriptions to be described later.

On the other hand, the service server (200) is a program for actually implementing the method of this invention. It is configured with a set of commands, and has the function to store the observation information inputted and uploaded from a plurality of user terminals, and to provide the observation information to a plurality of external expert terminals (300).

The form of the service server may be at least one server PC managed by a specific operator, or it may be a cloud server provided by another company that the operator can use by registering as a member. When the service server is implemented as a server PC, the corresponding service server may include a CPU and a memory. Since it has been explained above while describing the user terminal, the description thereof is omitted.

Finally, the external expert terminals (300) refer to terminals possessed or possessed by experts such as doctors, veterinarians, and pet trainers. The terminals may include a CPU and a memory. In this specification, the external experts refer to those who have been registered as experts through the service server in advance. In the registration process of external experts, documents to prove their qualification and other data (such as a copy of ID card) may be shared from the experts.

Till now, the structure of the overall system that can be built to implement the method of this invention has been described. Hereinafter, the method according to this invention, that is, the method for entering the observation information on an object and sharing it will be described.

Figure 2:
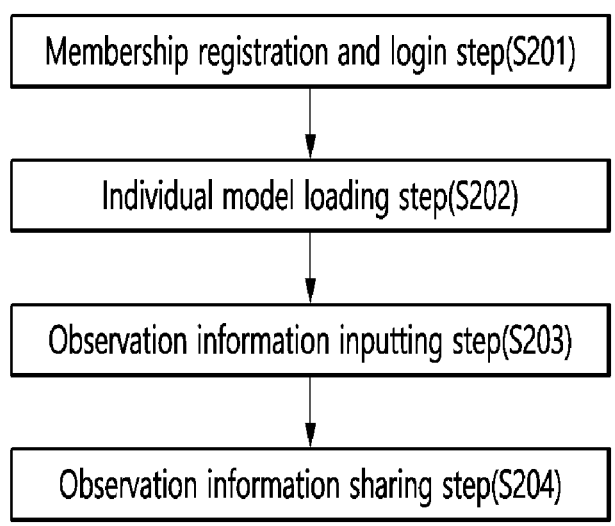
FIG. 2 schematically shows the method according to the invention in sequence.

In FIG. 2, the method for entering the observation information input and sharing it according to this invention includes the steps to register the membership and log-in (S201), to load the object model (S202), to enter the observation information (S203), and to share the information (S204). From now, each step and the user interface provided in the step will be described with reference to the drawings.

[Membership Registration or Login Step]

In the step S201, it provides an interface to enter the user information through the application in the user terminal. It is the stage to receive the personal information from the user to perform the membership registration or login procedure.

Figure 3:
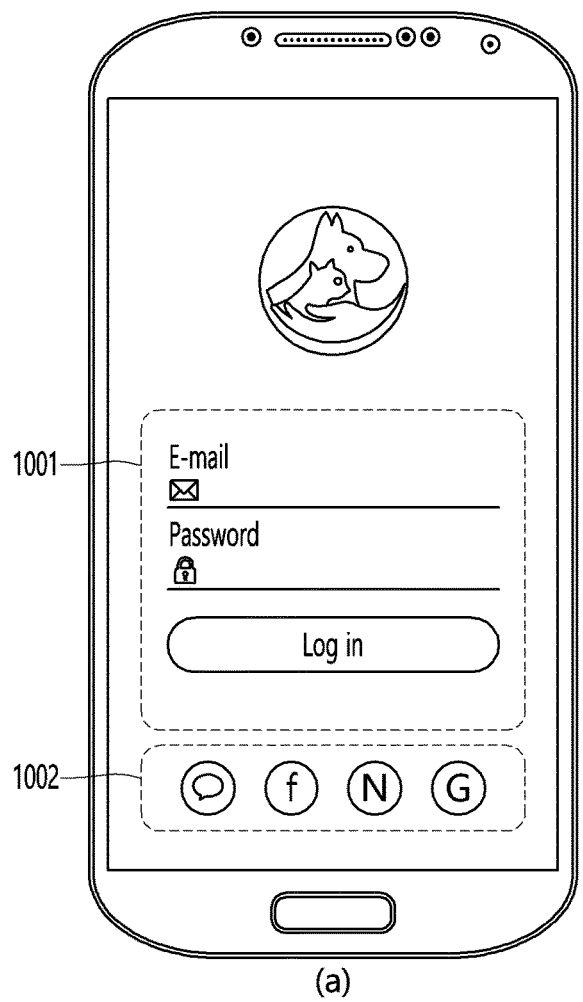
FIG. 3 (a) and FIG. 3 (b) illustrate the user's login screen.
Figure 3B:
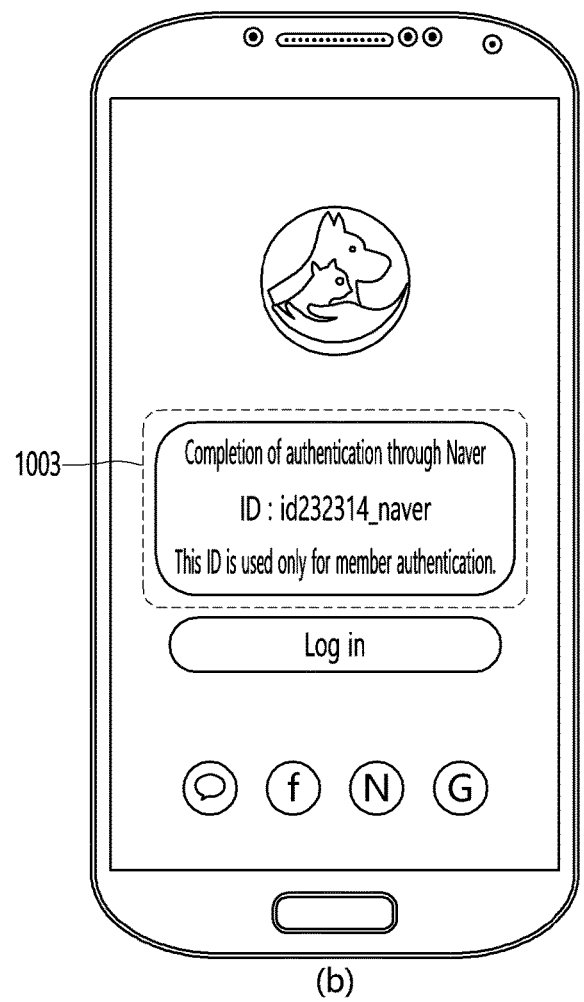

FIG. 3 (a) is the interface displayed when the user runs an application on the user terminal. It has an input box where the user should enter his/her e-mail address and the password for log-in. In addition, there is the password search button to find the password when the user forgot it, and the membership registration button for starting a membership registration procedure when a person wants to use the service for the first time (1001). In the method according to this invention, the logos of SNS service companies and portal sites are displayed (1002) at the bottom of the screen so that a user can log in using the login information of other SNS service companies and portal sites. FIG. 3 (b) shows an example in which a user is authenticated and makes log-in using the login information of N company among other portal sites. In order to use the login information of other SNS service companies or portal sites, the user has to sign in the service server according to this invention in advance. Here, a process of matching with login information of another portal site may be further performed.

Figure 4:
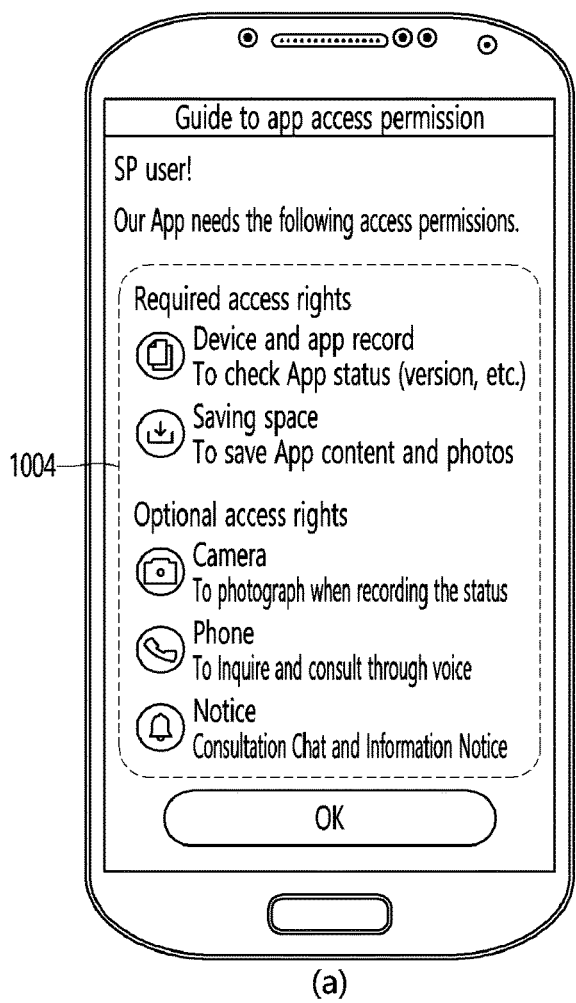
FIG. 4(a) and FIG. 4(b) illustrate the screen for transmitting the application access information and for receiving the input for user classification.
Figure 4:
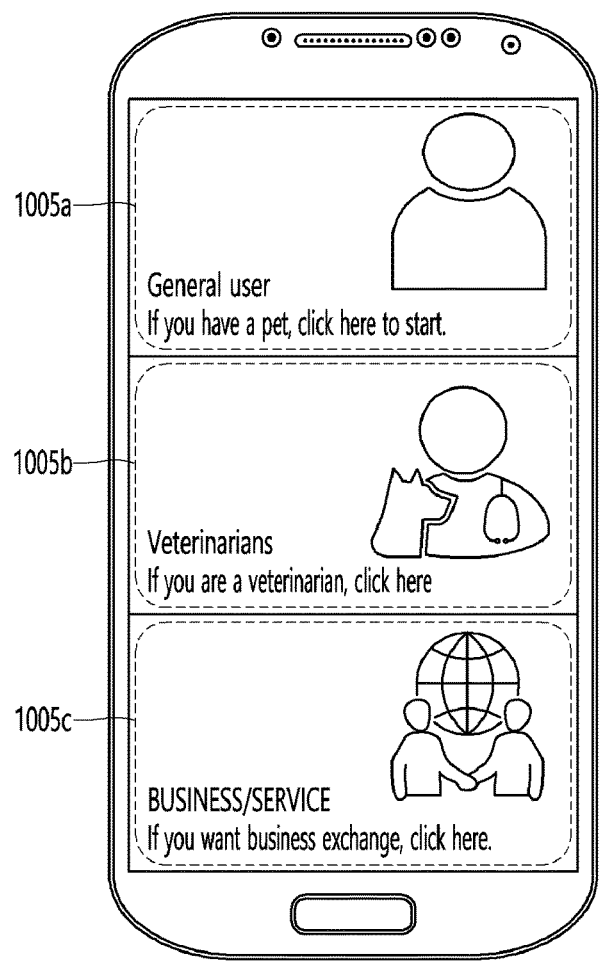

FIG. 4 (a) shows the interface that allows access to the user terminal when an application is first executed on the user terminal (1004). Meanwhile, FIG. 4 (b) shows the classification buttons that the user can select for the user classification (1005a, 1005b, 1005c).

In particular, FIG. 4 (b) is an interface for classifying the user when he/she signs up to use the service for the first time. This may include lists or buttons to differentiate between general users and external experts. As the service in this specification is for providing the observation information inputting and sharing services for pet animals, FIG. 4 (b) shows diverse relevant buttons: the 'general user' button (1005a) that can be selected by a user who wants to get advice from veterinarians based on the observation information he/she has entered; the 'veterinarian' button (1005b) that can be selected by a user who is qualified to treat pet animals and can provide advice based on the observation information shared by a general user; the 'business/service' button (1005c) that can be selected by a user who is neither a general user nor a veterinarian but wants to generate advertisement profits by providing other additional services. Thus, the method of this invention can provide an interface for distinguishing the user according to the purpose to use corresponding application at the time of membership registration.

FIG. 5 shows the interfaces for guiding the terms and conditions of use and obtaining the consent from the user when using this application. FIG. 5 (a) displays the screen to obtain the necessary consent in providing the service, such as consent to terms & conditions of service, consent to collection and use of personal information, and consent to provision of personal information to third parties (1006). FIG. 5 (b) shows an example in which the entire contents of terms & conditions of use are displayed when the user clicks to agree to the terms & conditions of use in FIG. 5 (a) (1007).

Figure 6:
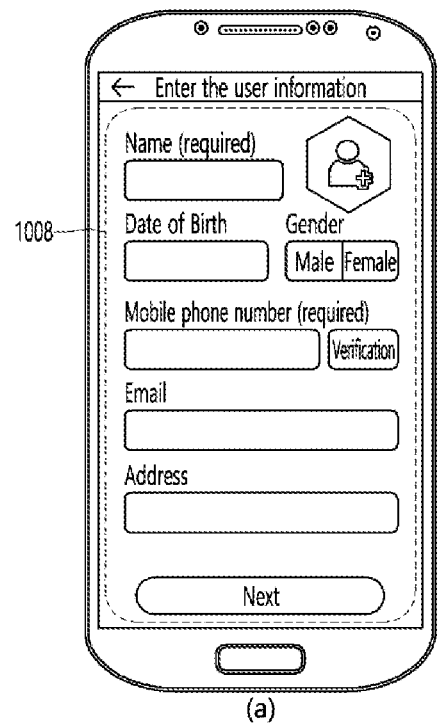
FIG. 6 (a), FIG. 6 (b) and FIG. 6(c) show the screen for receiving the user information input from the users.
Figure 6:
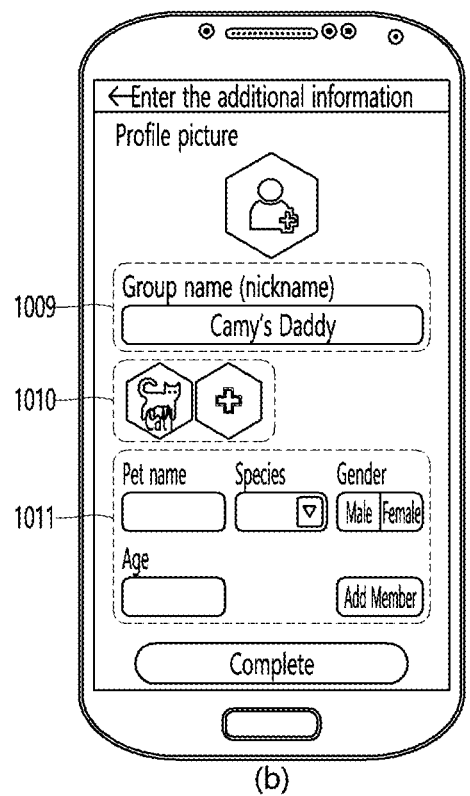
Figure 6:
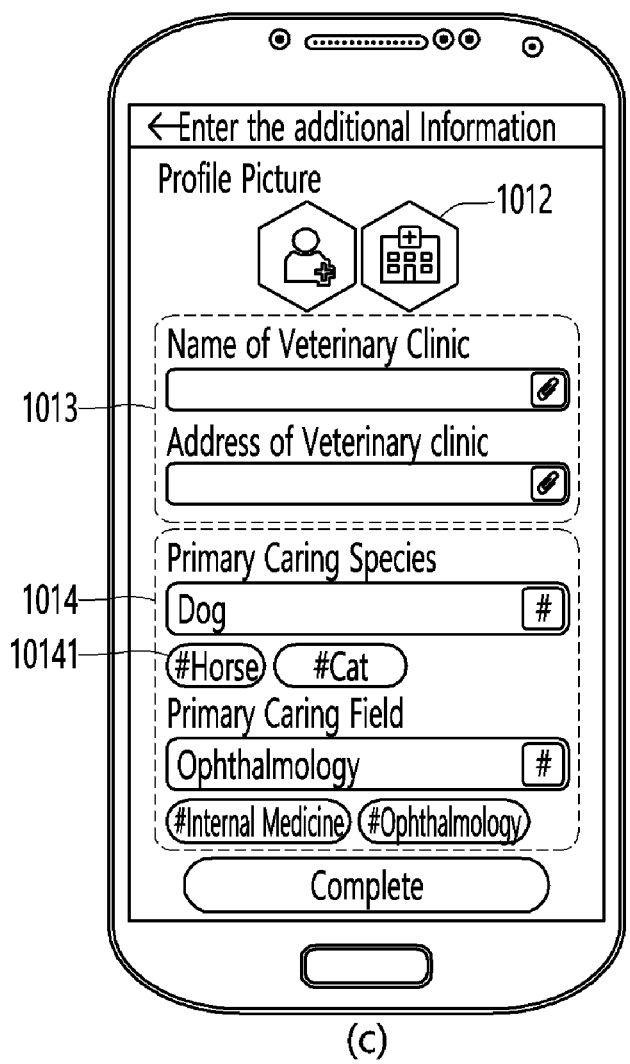

FIG. 6 shows the interfaces through which a user can enter the membership information when registering as a member. Among them, FIG. 6 (a) is the interface to enter the common information for all users; (b) is to enter additional information for general users; (c) is to enter additional information for external experts (veterinarians).

First, in FIG. 6 (a), all users such as general users, external experts (veterinarians) and other users should enter his/her name, profile picture, date of birth, gender, mobile phone number, email, or address (1008). When a mobile phone number is entered, an authentication procedure may be further performed using the corresponding mobile phone number.

FIG. 6 (b) is the interface that a general user can enter the additional information, which includes the nickname and the pet information. In the input box for entering information about the pet cared by the user, there is an input box for entering the profile icon (or photo) of the pet animal (1010), and one or more boxes for the name, species, gender, and age of the pet (1011). When the user has another pet, the profile icon (or photo) of the pet can be added by clicking the ADD button, or by clicking the 'add member' button in the input field (1011) where the pet information can be entered.

FIG. 6 (c) is the interface that an external expert, e.g., a veterinarian, can enter additional information when registering as a member. Here, in addition to the user's profile picture, an icon (or picture) indicating the institution (veterinary clinic) where the user works can be added (1012). This is to enable the general users to intuitively recognize where the veterinarian is working in and how large the veterinary clinic is when selecting a veterinarian to share their observation information in the future. It is also to make the veterinarian's affiliation more clearly recognized. The interface for entering additional information of the veterinarian may include an input field for entering the name and the address of the veterinary clinic(1013). Furthermore, it may also include the veterinarian's field of expertise such as main treatment animal species and main treatment subject (1014). In addition, the input box for entering the name and address of the veterinary clinic may further include an icon (clip icon) for searching the relevant clinic. The input box for entering the veterinarian's specialty (1014) also has the tag creation button (#icon) to automatically generate a tag keyword by clicking after input. For example, if a veterinarian who wants to sign up for membership selects a cat as his main animal species and clicks the tag creation button, the tag keywords (10141) such as "#cat" are created. These tag keywords (10141) can be used as search keywords when a general user finds a veterinarian to share the observation information with in the future, that is, when selecting a veterinarian to share from among numerous veterinarians. The tag generation button may be used in the same way for the main treatment subject.

As above, FIGS. 3 to 6 show the stages, particularly the user interfaces, for the membership registration or log-in of users in the method according to this invention.

[Object Model Loading Step]

In FIG. 2, after the membership registration or login (from the viewpoint of a general user), the step (S202) of loading a model corresponding to the object is performed so that the observation information on the object can be entered in earnest.

Figure 7:
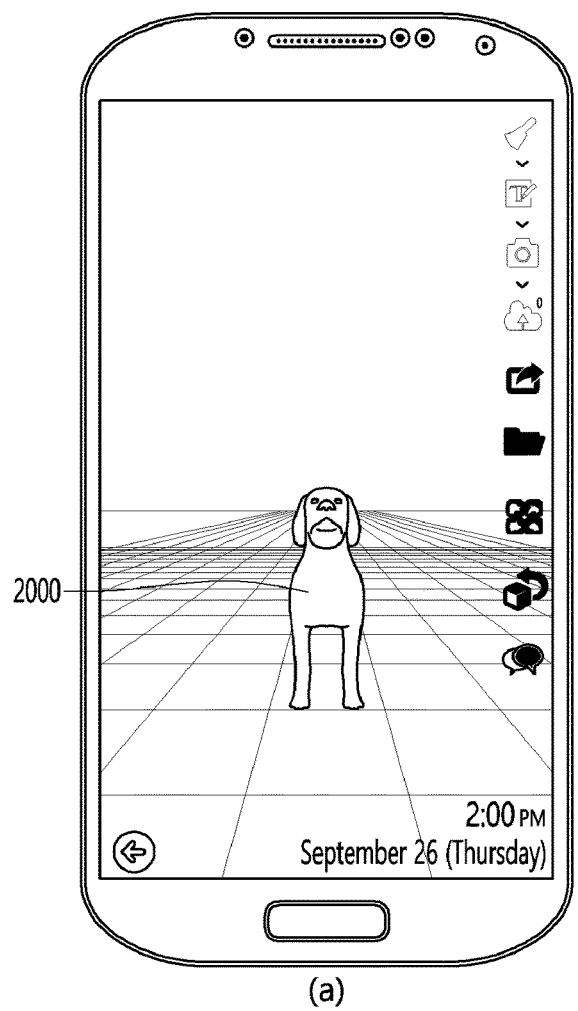
FIG. 7(a) and FIG. 7(b) show the screen on which the object model is loaded.
Figure 7:
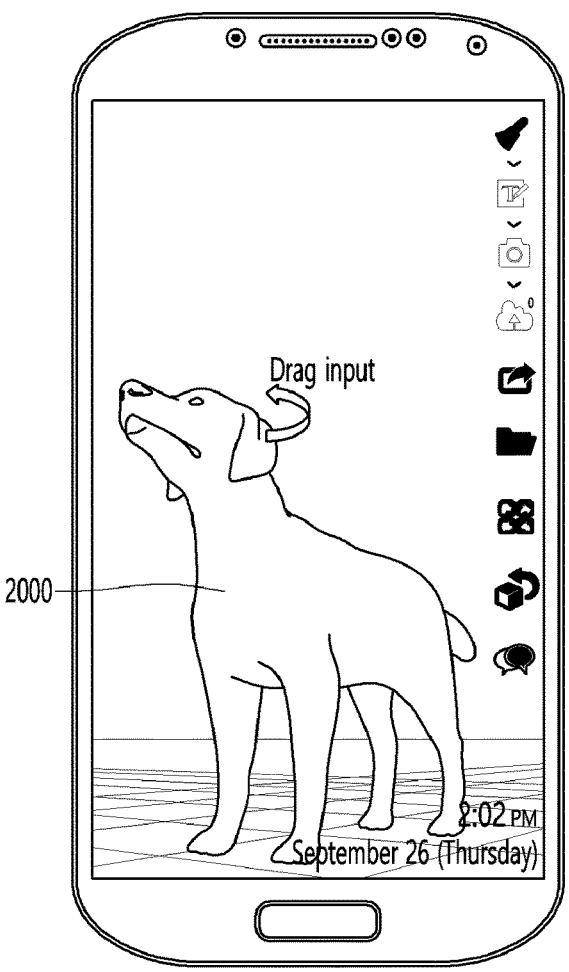

FIG. 7 shows the screen of user terminal in a state in which an object model (2000) has been loaded. In this specification, for convenience, the object is assumed as a dog. The loading of the object model (2000) may be understood as the same process as loading a modeling file previously stored in the memory of the user terminal. In this case, the above modeling file may be the downloaded one in advance from the service server (200). Or, the modeling file may have been generated by the user directly through 3D scanning. In this case, the user may register the modeling file obtained through 3D scanning in the service server (200) and then let it possible to download the file from the applications installed in the user terminal. Alternatively, the user may directly save the modeling file in the memory of user terminal, and then download the file from the applications in the user terminal.

For any object model, it can add the animation function to make it move from a stationary shape through the subsequent work process and operation on the relevant software, just with the user's simple touch of the object model part according to the contact time, number and/or degree. For example, in the Golden Retriever 3D model shown in FIG. 7, when entering the information observed inside the left ear, the user presses the left ear for a few seconds and drags it to lift up, Then, the user enters the problem inside the ear in the input box. With this, the user can appropriately display and enter the intuitive information according to the initial feeling and intention. The same can be applied to the tail or the mouth.

On the other hand, various species of objects may exist in the above object model (2000). In that case, the user can select and load an arbitrary object from among a plurality of modeling files previously created in the service server (200). For example, the step to load the object model may include the step to select the pet species, or the membership registration step may include the step for the user to refer to the pet species information previously entered by the user. In the step of selecting the pet species, several species of pet animals in the form of thumbnails may be displayed on the screen so that the user can easily search for the species most similar to his/her pet animal. By selecting one of these, the user will be able to find an object model that most closely resembles his/her pet animal.

For the pet animal raised by the user, this invention can construct a system that registers the current modeling files owned by a plurality of institutions, for example, veterinary clinics with business agreements, or the modeling file directly scanned by the user in 3D to the service server (200). When visiting a veterinary clinic because his or her pet is sick or has a mental/behavioral abnormality, the user can take a picture of his or her pet using the 3D scanning device provided in the veterinary clinic. The modeling file obtained as such may be registered in the service server (200). In the case that the user already has the pet profile, it can produce a 3D model not only for the body of pet, but also for the cells, tissues, or organs in pet's body which may cause the diseases when judged by experts. If the cells, tissues, or organs are placed in the body, it will appropriately increase the transparency of the body to make it appear in contrast; if the cells, tissues, or organs are separated from the body, the user can select and call them to use as a separate object model. For example, the intestines such as the heart and kidneys of pets, or inner organs such as the eyes of pet may also become the subjects of 3D modeling. In some cases, when their transparency is increased, the organs may be used for the user to look inside the pet's body. Or, by displaying each organ separately on the screen in 3D, the user can mark or input the symptoms and pain levels in the corresponding organ, which will be described later. Even when another internal organ exists inside an external organ, it can also make the internal organ visible by increasing the transparency of the external organ. Thus, the 3D modeling allows the user not only to see the organs in the pet individually, but also to edit the organs diversely by adjusting the transparency.

If the pet modeling file is provided and uploaded in this way, the user can easily obtain the modeling file for the pet or the cells, tissues, or organs inside its body. And the operator of the services explained in this invention will be able to easily induce the membership registration. The veterinary clinics can also get the marketing effects by increasing the satisfaction of the pet owners through higher empathy and communication with them. Furthermore, when the interface provided by this invention is used, the degree of empathy with pet animal owners and guardians as well as the communication environment can be improved, thereby increasing user satisfaction. Then, various additional effects such as profit increase and information mapping that transcends the time and space of similar patients can be achieved.

Up to now, the step of loading the object model has been described with reference to FIG. 7.

[Observation Information Input Step]

In FIG. 2, after the object model is loaded, the step of receiving the observation information from the user (S203) may be performed. The user interface provided to enter the observation information is one of the most important parts in this invention, which will be described in detail with reference to the drawings.

Figure 8:
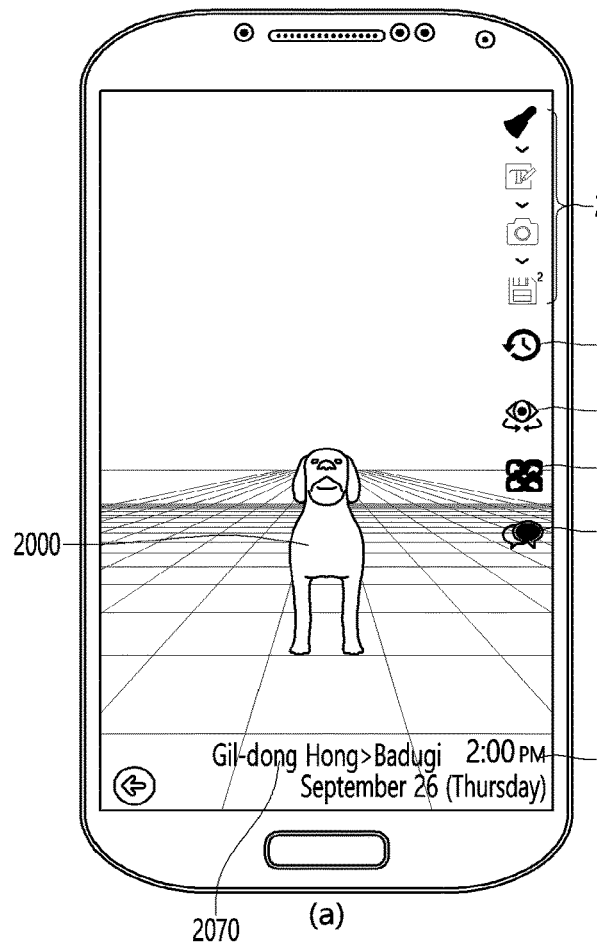
FIG. 8(a) and FIG. 8(b) show the screen for inputting the observation information.
Figure 8:
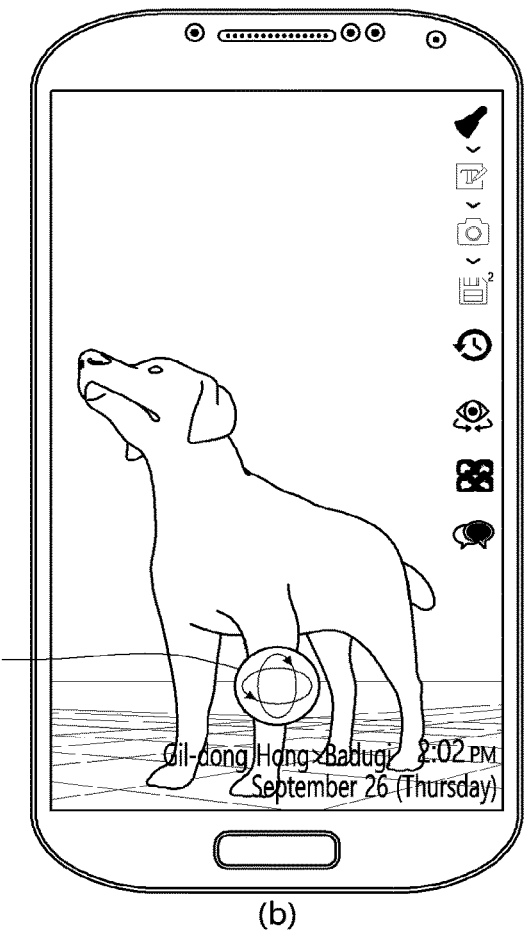
Figure 8:
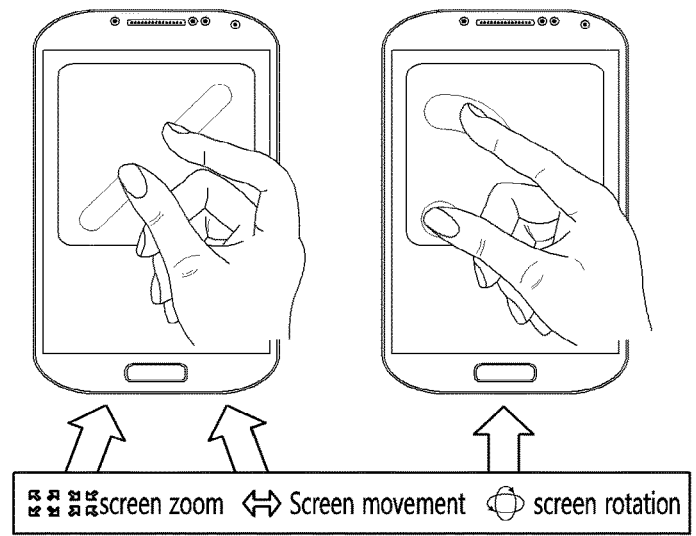

First, FIG. 8 shows an example of the basic user interface that a (general) user enters the observation information. In FIG. 8 (a), the user interface provided for inputting the observation information has the screen with the object model (2000), which displays the tools (2010) for direct input of the observation information on its side. In addition, it can include the information inquiry tool (2020) for time-series inquiry of the observation information from the past to the present, the object re-position tool (2030) for changing the object model to the original position (initialized state of camera position), the object change tool (2040) for selecting/changing/adding the pet, and the chat start tool (2050) for executing a chat function. Furthermore, the bottom of the screen shows the environmental information (weather, temperature, location, time, date, weekday, etc.) at the time when the observation information is entered (2060) as well as the name of general user and the name of pet (2070).

The direct input tools (2010) of the observation information may include brush input tool, mood and activity level input tool, text input tool, and photo or video input tool. It will be described later, but the above tools are activated according to a predetermined sequence, starting with the brush input tool, to naturally guide the input of the observation information. That is to say, the tools are set up to be activated in the order of brush input tool >mood/activity input tool >text input tool >photo or video input tool >save and upload. Only when completing the previous input, the user can move to next step so as to guide the user to enter the observation information step-by-step without omission. By entering the steps whose intuitive feelings can be easily disappeared, the user can enter the feeling and memory information that the user initially intended without forgotten, distorted, changed or confused as much as possible. This will be described in detail later.

The information inquiry tool (2020) allows the user to check the observation information that the user has entered in the past in time series. With this tool, the user can check with the digital information easily and precisely how the pet was in the past, how it has changed and whether its condition has improved or worsened. This will also be described in detail later.

The object re-position tool (2030) is to initialize the viewpoint when the user has rotated the object model or moved it horizontally/vertically by touching the screen of the user terminal. By clicking this object re-position tool (2030), the user can go back to the time point when the model was loaded.

The object change tool (2040) allows the user to select/change/add the pet animals. As previously mentioned, multiple pet animals can be registered when the user registers for the membership. When there are two or more pets, the user can change the object of the observation information by clicking the object change tool (2040).

The chat initiation tool (2050) is for opening a chat room in which the user can invite an external expert (veterinarian), etc. to share the observation information and then receive the opinions based thereon. This will also be described later.

In addition to the various types of tools mentioned above, it displays the environmental information at the bottom of the screen in FIG. 8 (*a*). The environmental information may include at least one of weather, temperature, location, time, date, and weekday at the time the user enters the observation information. Most of the observation information entered through the user interface in the method of this invention may be classified as health care information or medical information. The information is usually accumulated in the service server (200). When the above environmental information is entered along with the observation information, it is very effective in obtaining useful results when the user analyzes the big data using the accumulated information in the service server (200). For example, if an infectious disease for a certain species is widely prevalent for a specific period, the observation information entered by multiple users and the environmental information included in such observation information can be helpful to identify significant changes in the location, environment and season that the epidemic has become prevalent and mitigated. Furthermore, if the method of this invention and the user interface were provided worldwide so that the observation information and the environmental information could be obtained not only in Korea but also in other continents, we would analyze the data stored in the service server (200) to find out how the people living in similar environments have coped with the epidemic of the specific species occurred in the regions, or in what environment the epidemic has mitigated. In this way, the environmental information included in the observation information can not only serve to inform the user who is entering the observation information about the current environment, but also be broadly shared for helping the big data analysis in the future.

FIG. 8 (*b*) shows another example of the user interface for inputting the observation information. Here, the position rotation display tool (2080) is additionally included so that the object model (2000) can be viewed from various viewpoints. The position rotation display tool (2080) allows the user to change the viewpoint of observing the object model through the pinch input and the dragging input. For example, in the method of this invention, if the user touches the screen with a finger and drag it in the user interface, the screen rotates; if the user touches the screen with two fingers and drag it, the screen moves horizontally; if two fingers are touched on the touch-sensitive screen and pinched in/pinch-out, the screen becomes reduced/enlarged.

Up to now, the tools for inputting the observation information have been schematically reviewed with reference to FIG. 8.

Figure 9:
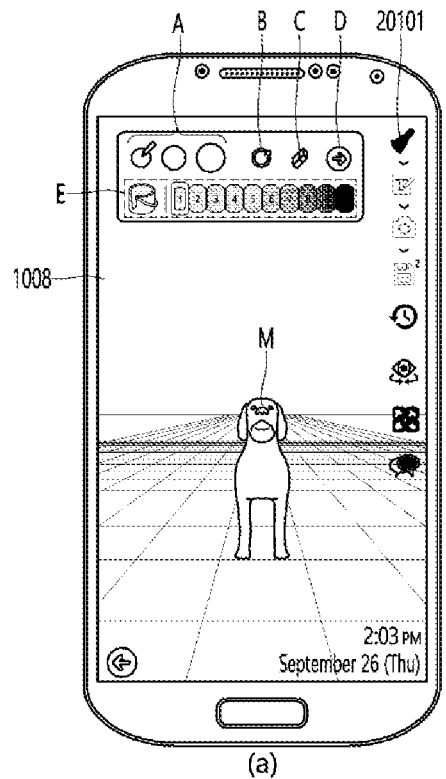
FIG. 9 (a)
Figure 9:
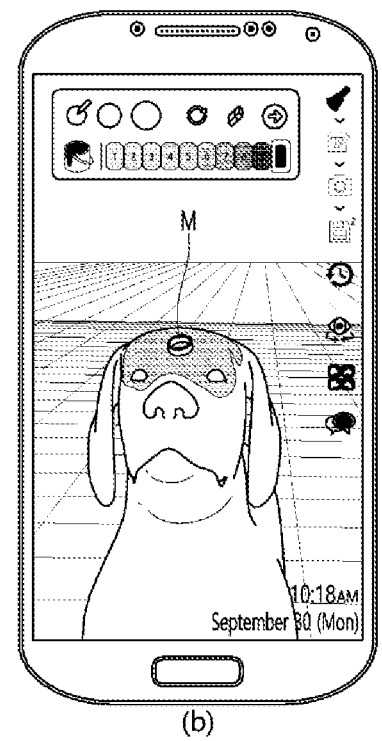
Figure 9:
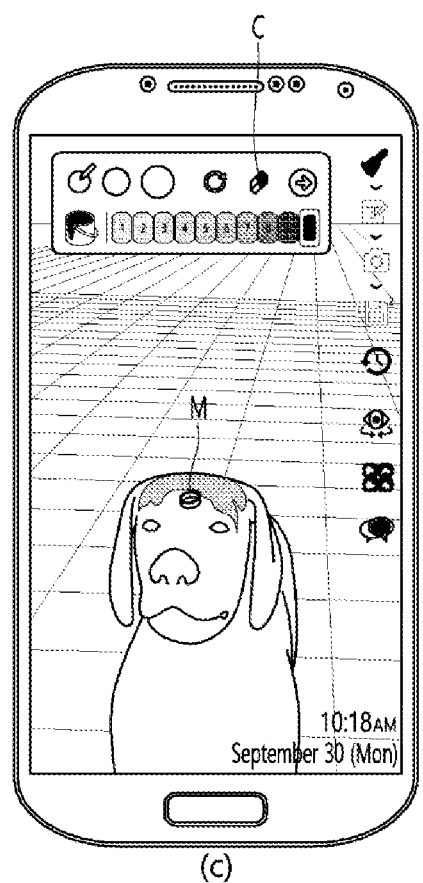

FIG. 9 is for explaining the function of the brush input tool (20101) among the tools for directly inputting the observation information. Specifically, FIG. 9 (*a*) shows the user interface that is initially displayed when the brush input tool is selected, and FIG. 9 (*b*) is the screen in which the brush input is applied to the surface of an object model. And FIG. 9 (*c*) is the view to erase the brush input from the surface of the object model.

In FIG. 9(*a*), the brush input tool (20101) can include the brush size selection menu (A), the input initializing menu (B), the input rescinding (erasing) menu(C), the go-to-next menu (D), and the brush color selection menu (E), and the marker (M) may be displayed on the object model. The brush size selection menu (A) is for determining how large the brush to use when the user colors the object model surface marked with the marker (M). As described in the figure, 3 sizes are provided by default, but the size is not limited thereto. The input initializing menu (B) can be used when the user wants to go back to the initial state after entering colors on the object model through the brush input. The input is made in red (C) is, unlike the input initializing menu (B), to cancel or erase some previous inputs in the current input state, and has the same effect as deleting the brush input with the eraser on the user interface. FIG. 9 (*b*) shows an example in which a red brush input indicating the severity state (10) is made on the face of the object model. In FIG. 9 (*c*), some of the brush input is deleted by the rescinding (erasing) menu. It is noteworthy that, in the user interface of this invention system, the current menu being used by the user is displayed as C, as shown in FIG. 9 (*c*). In other words, the menu which is currently activated and used by the user is indicated by color so that the user can easily recognize the fact.

The go-to-next menu (D) is a menu for proceeding to the next level of entering the pet's mood and activity when the brush input on the object model is completed. The brush color selection menu (E) allows the user to express the degree of pet's wound or internal injury with color after looking into the state of the pet animal. In the drawing, the closer to yellow, the more mild, and the closer to red, the more severe. Colors for indicating the degree of state may be, unlike the drawing, implemented so that the user can select them by opening a separate pop-up window. Finally, the marker (M) is for accurately expressing the position where an input is to be made. As shown in the drawing, it may be implemented to have a specific geometric shape on the surface of the object model. Preferably, it may be implemented in the form of a cylinder as shown in FIG. 9. The marker (M) of such a shape can be freely moved on the surface of the object model to accurately inform the user of a position where the brush input is to be made. In addition, the marker M can be implemented to move only on the surface of the object model. By preventing the marker (M) from leaving the surface of the object model, it can help the user easily input the information. The marker (M) can be used not only for the brush input on the surface of the object model, but also on the inside of the model. For example, pet animals may have diseases not only on the skin but also on the internal organs. Even if a non-expert general user cannot accurately determine the cause of the disease, it is necessary to make the brush input on internal organs so that the user's opinion obtained by observation is reflected. In this case, the marker could be placed on the internal organs of the previously generated 3D object model so that the user can input the brush on it. For example, when assuming that the marker (M) is in the form of a cylinder, the part from the bottom of the cylinder to a specific height (hereinafter, the lower part of marker) is displayed to locate under the skin surface of the object model so as to make it possible to input the brush inside the skin in the object model. At this time, the length of the lower part of marker can be adjusted again so as for the deep inside under the skin of an object to be marked. At this time, the brush input for each depth can be made in different colors. For example, after extending the lower part of marker up to 1 cm below the skin, the user can enter the yellow color at that point; then, after extending it to 1.5 cm below the skin, the user enters the orange color at the corresponding point; finally, after extending it to 2 cm below the skin, the user enters the red color at the corresponding point, thus showing different pain levels according to the depth. The marker shape may be converted from a cylinder to a cone or vice versa from a cone to a cylinder. The menu on the interface for changing the shape as above may be provided separately (toggle or sliding type), and the menu on the interface may be displayed so that the heights of cone-shaped and cylinder-shaped marker can be adjustable (sliding type). In particular, the marker of cone shape is appropriate for expressing, for example, a gunshot wound in the object model (the incident site will be a circle with a small diameter, but the exit site will form a larger circle due to the rotation of the bullet).

Figure 10:
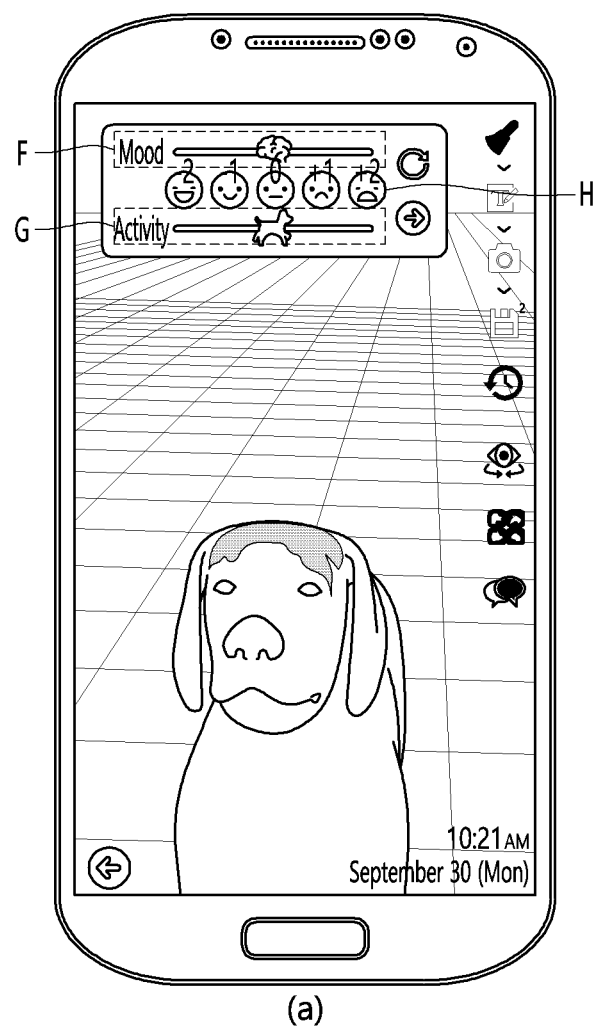
FIG. 10(a) and FIG. 10(b) are for explaining the menu to enter the mood level and activity level of an object.
Figure 10:
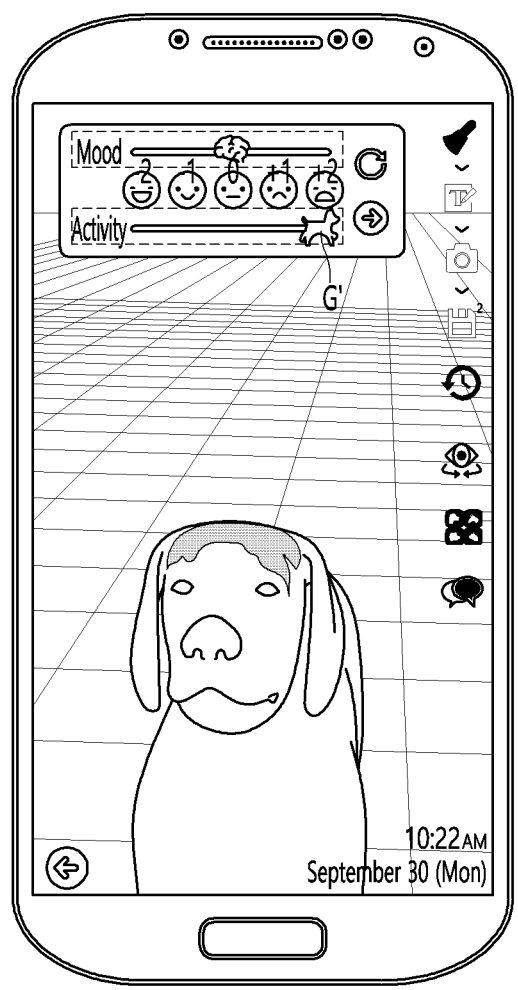

FIG. 10 shows an example of the user interface displayed when the user clicks the go-to-next menu (D) after the brush input in FIG. 9 is completed. Here, the menus are provided to input the pet animal's mood level and activity level.

In FIG. 10 (a), the user interface provides a sliding-type input menu (F) so that the user can arbitrarily select the mood level of the pet as well as a sliding-type input menu (G) for selecting its activity level. At this time, the icon for sliding adjustment may be further displayed so that the user can intuitively understand how the mood level or the activity level of pet is. In the drawing, the brain icon displays the level of mood and the pet-shaped icon displays the level of activity. In addition to the sliding type input menus (F, G), another type of icon (H) may be provided so that the user can intuitively understand the level of the input value.

In FIG. 10 (b), the icon being adjusted by the user may be displayed with a different color (G') to enhance the user's visual recognition.

Figure 11:
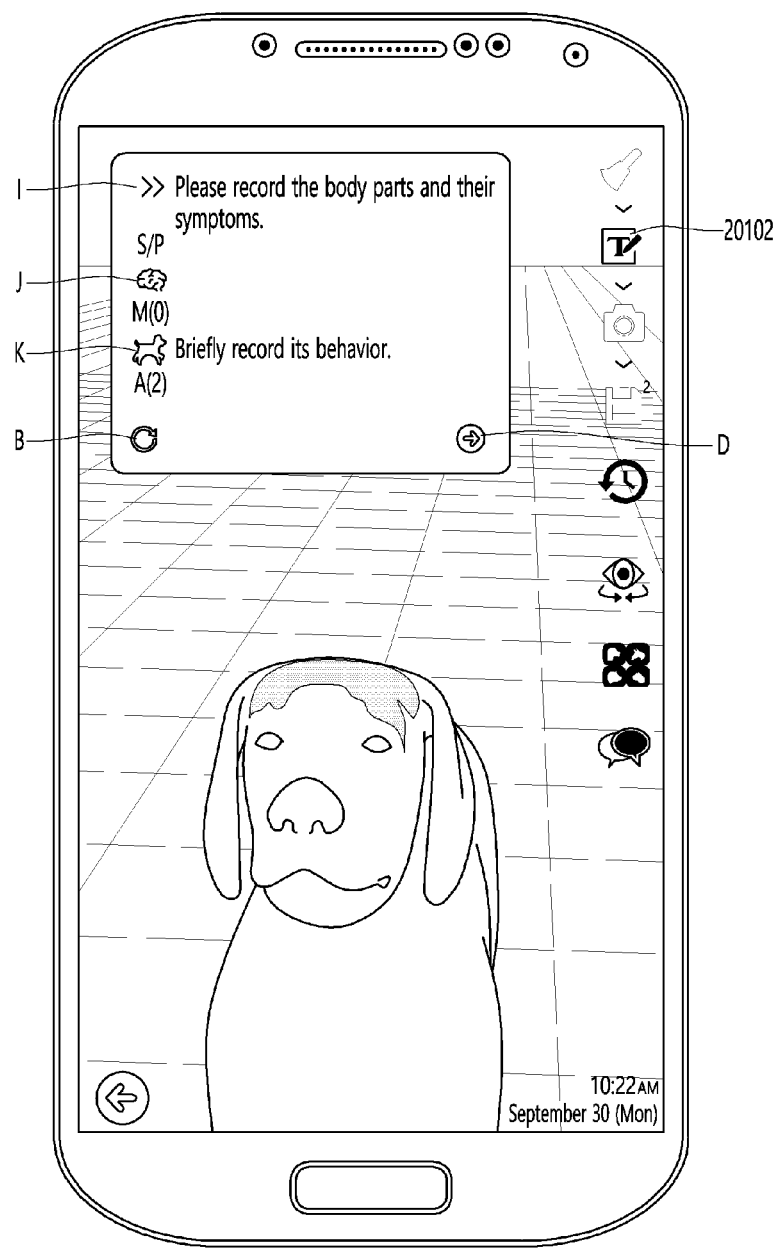
FIG. 11 is for explaining the menu to enter the observation information in a text manner.

FIG. 11 illustrates an example of that user interface that the user can enter the text after the brush input shown in FIG. 10 above. The interface in FIG. 11 can appear when the go-to-next menu (D) in FIG. 10 is clicked. If the user clicks to proceed to the next step after completing all brush inputs, the text input step is implemented. In FIG. 11, the text input tool (20102) among the input tools on the right side of the screen is activated, through which the user can easily know what stage he/she is currently in.

The text input menu can be displayed at the top of the screen, which includes the text input box (I) for recording the body part and its symptom, and the boxes (J, K) for recording the mood and activity level of the pet animal. The input initialization menu (B) and the go-to-next menu (D) may be displayed in the same manner as previously seen in FIGS. 9 and 10. In the text input fields (J, K) for recording the mood level and the activity level, the values entered by the user using the slide adjustment in the previous step can also be displayed together. In FIG. 11, "M(0)" and "A(2)" are marked, which correspond to the mood level and activity level entered through slide control in FIG. 10, respectively. If the mood or activity level is entered as 0 in the previous step, that is, if the mood level or activity level is felt normal by the observer's point of view, the text input field can be deactivated. In FIG. 10 (b), there is an example in which the mood level is entered as 0 and the activity level as +2. Accordingly, the text input field (J) for entering the mood level in FIG. 11 is deactivated, but the text input field (K) for entering the activity level is activated. In the text input window of FIG. 11, the text input box for inputting the activity level has a guide phrase "Please briefly record the behavioral state" in it, whereas the input box for entering the mood level has none.

When each of text input field is clicked by the user, a keyboard for text input may be displayed at the bottom of the screen, and the user can enter the desired content using the keyboard.

The reason this invention provides the user interface for separate text input as shown in FIG. 11 is to deliver more accurate contents to the external expert (veterinarian) even though the steps or interfaces described in FIGS. 9 and 10 have already been completed, or to freely describe what the user wants to ask when delivering the observation information to an external expert (veterinarian). In addition, such texted observation information is highly useful in the big data analysis, greatly increasing the accuracy of understanding on the object.

Figure 12:
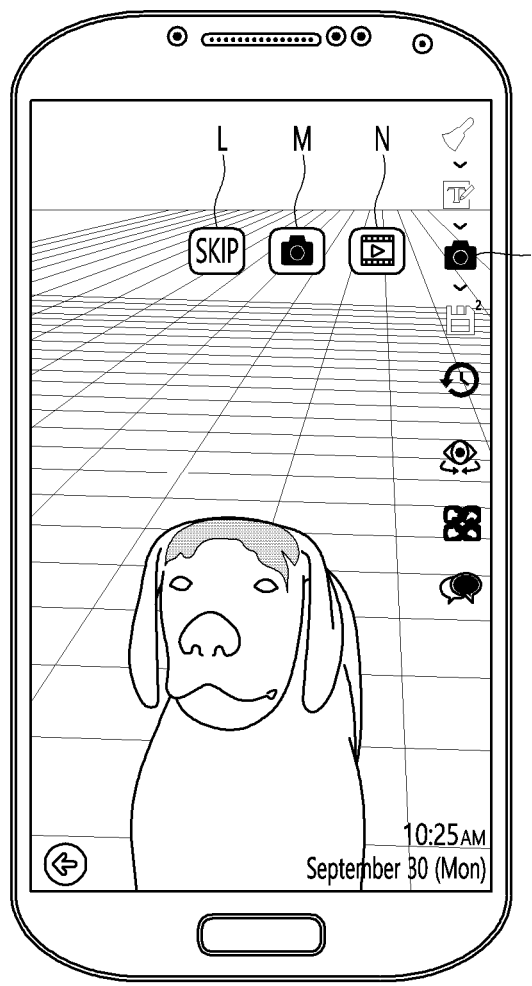
FIG. 12(a) and FIG. 12(b) are for explaining the function to photograph an actual object.
Figure 12:
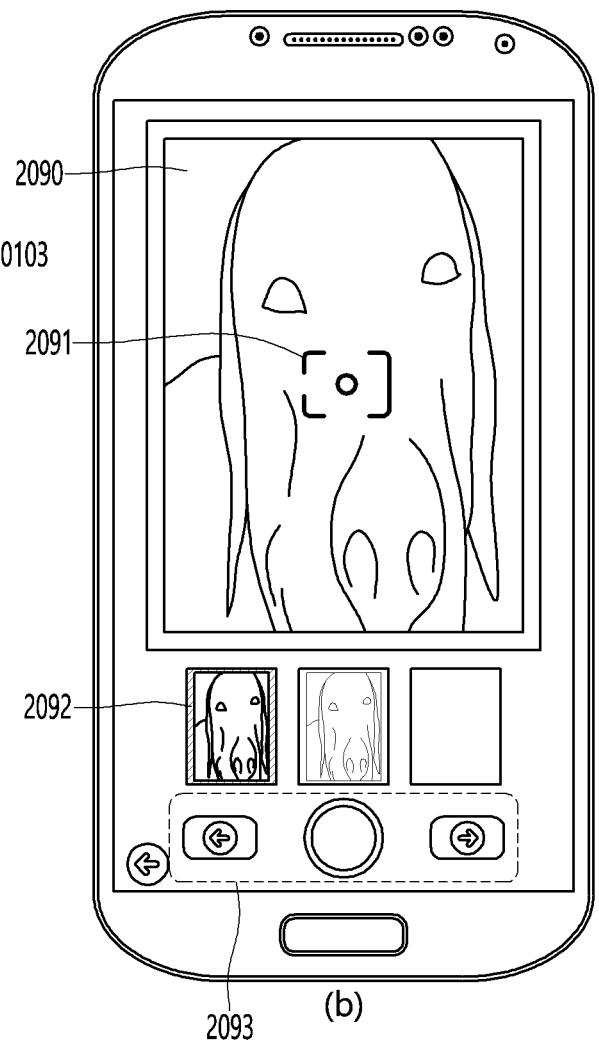

FIG. 12 shows an example of the interface displayed when the user clicks the go-to-next menu D after completing the text input in FIG. 11. FIG. 12 illustrates the state of the user interface that a photo or video can be taken of a pet animal.

In FIG. 12 (a), the photographing input tool (20103) on the right side of the screen is activated. On the left side of the photographing input tool (20103), there are the skip menu (L), the photo menu (M), and the video menu (N). Such menus are arranged side by side at the same height as and close to the photographing input tool (20103) so that the user can easily recognize what step he/she is in. Not only the menus corresponding to the photographing input tool (20103) but also all other menus mentioned in this specification are arranged on the side close to their corresponding input tools. It is because, when the menus are at the closest distance to the corresponding input tool, the user can easily recognize the current step he/she is in and can focus more on the inputting action by minimizing the distraction. In particular, the skip menu (L) is used when the user wants to proceed to the next step without taking photos or videos; the photo menu (M) and the video menu (N) start taking photos or videos, respectively.

FIG. 12 (b) is the interface displayed when the photo menu or the video menu is clicked, which includes the photographing window (2090), the focusing mark (2091), the photographing picture (video) list (2092), and the manipulation tool (2093) including the tools such as previous photo, next photo, and start shooting.

FIG. 12 is assuming that the user terminal (100) is equipped with a means for photographing, that is, a camera. If just a means for recording the sound rather than a camera is equipped, a button for recording the sound only can be added. If other types of information-acquiring means related to the object are equipped, a menu corresponding thereto may be displayed on the interface.

Figure 13:
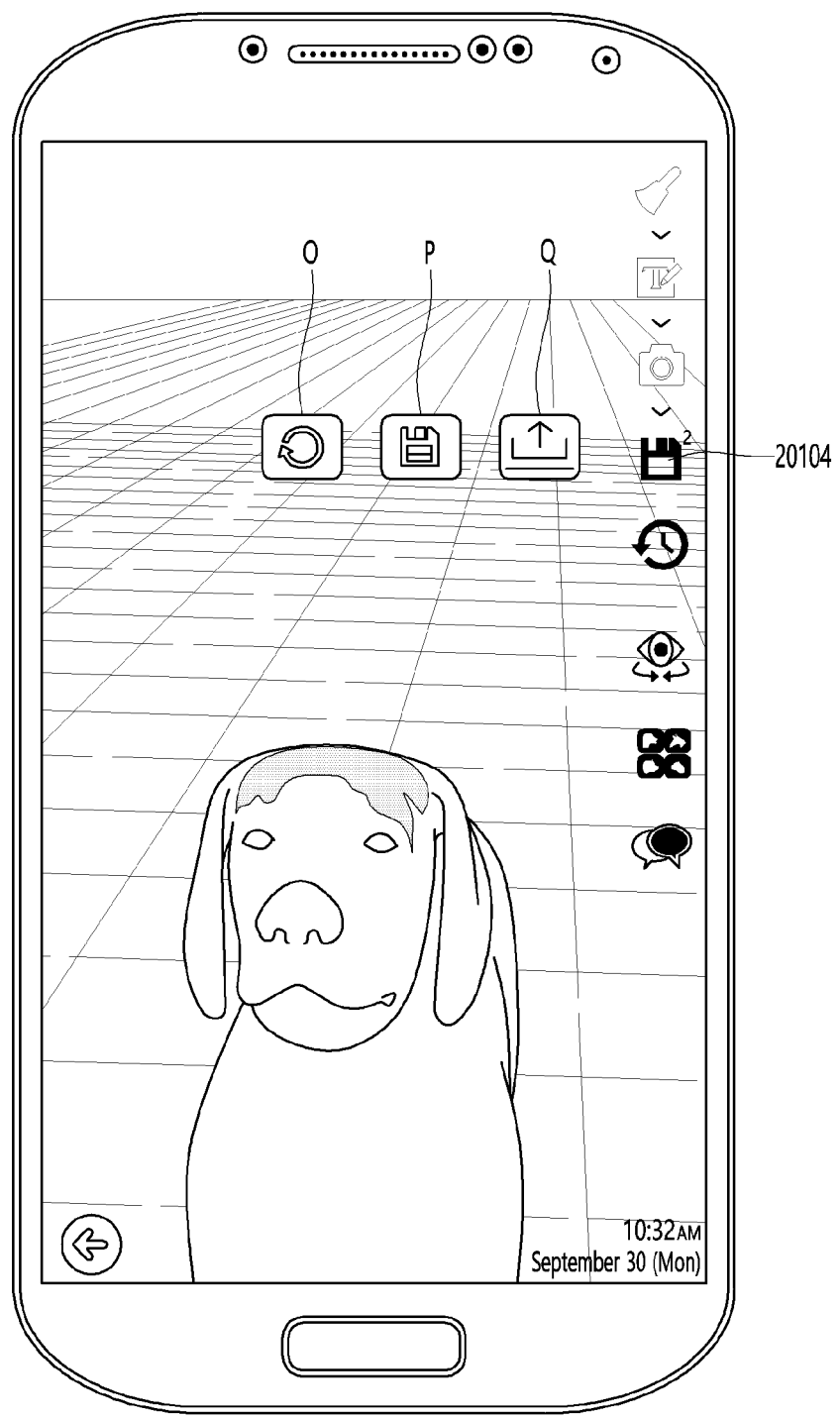
FIG. 13 is for explaining the function to upload the entered observation information.

FIG. 13 shows the user interface for the tool to save and upload the observation information, which is the last step among the tools for inputting the observation information. In FIG. 13, among the tools listed on the right side of the screen, the disk-shaped save and upload tool (20104) is activated, with which the user can easily identify what stage he/she is currently in.

On the left side of the save and upload tool (20104), there can be the initialization menu (O), the save menu (P), and the upload menu (Q). Each of the menus is at the same height as and close to the save and upload tool (20104) icon. In particular, the initialization menu (O) is used to delete the information stored in the memory (cache memory) in the user terminal (100); the save menu (P) is used to store the observation information, which has been temporarily stored on the user terminal (100), permanently in the non-cache memory such as a micro SD card, etc.; the upload menu (Q) is to upload the observation information, which is permanently stored in the non-cache memory of the user terminal (100), to the service server or the cloud database.

Up to now, the tools for inputting the observation information (2010) have been explained. Hereinafter, the information inquiry tool (2100) will be described.

Figure 14:
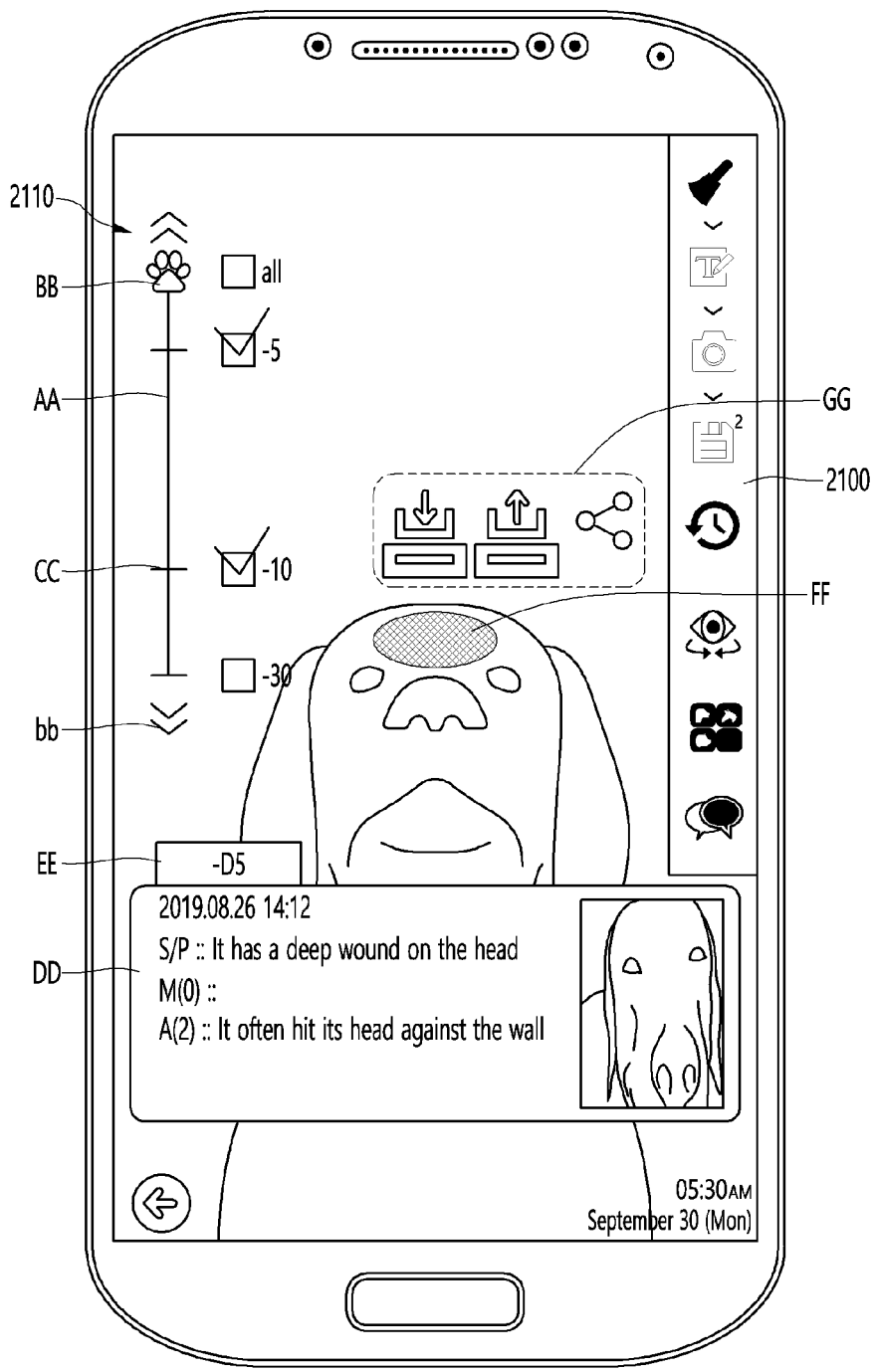
FIG. 14 is for explaining the function to inquire the observation information accumulated in time-series from the past.

FIG. 14 illustrates an example of the user interface displayed when the information inquiry tool (2100) is clicked. The user interface of the information inquiry tool (2100) provides the user with the function to view the observation information that has been accumulated and stored in the chronological order. This function allows the user to easily check how the condition of the pet has improved or worsened at a glance over time, either from a fixed 3D model position/angle or while the 3D model position/angle is rotated around the central target site. There is no limit to the number of observation information that can be accumulatively saved in the user terminal (100) or the server (200).

In the user interface of the information inquiry tool (2100), the most important feature is that the information search tool (2110) in the form of a slide is provided for searching for the observation information accumulated and stored from the past to the present. The information search tool (2110) again includes the sliding bar (AA), the sliding icon (BB) and the scale (CC). By dragging the sliding bar (AA) with the sliding icon (BB), the user can easily search for the observational information. In addition, the information search tool (2110) provides another way to search instead of dragging the sliding icon (BB): whenever the search button (bb) is pressed, the observation information is viewed step by step. Meanwhile, the daily or successive observation information corresponds to the scale (CC). FIG. 14 shows that the observation information of 5 days ago, 10 days ago, and 30 days ago are accumulated and stored in order. Assuming that observation information for the 15th day is stored, the numbers of 1/15, 2/15, 3/15, ⊚ are displayed next to the scale (CC) to make it easy to check when the observation information currently being viewed by the user was recorded. When the sliding icon BB is placed on a certain scale or when the navigation button (bb) is pressed to reach the observation information corresponding to a certain scale, the observation information of the date can be displayed through the information window (DD). The information window (DD) can also include displaying of date or day for indicating at which time the corresponding observation information was recorded. The drawing indicates that the information 5 days ago as of today is being inquired (EE). Meanwhile, the information window (DD) can display the observation information recorded by the user on the corresponding date or day, more specifically, the text and the picture/video of the pet animal entered by the user.

In FIG. 14, the information window (DD) displays the text input time such as "2019.08.26. 14:12", the body part and symptom(S)/Pain(P) such as "S/P:: deep wound on the head", the mood level such as "M(0)::", and the activity level text such as "A(2):: Often hit her head against the wall." A photo or video taken at the time may also be displayed. Furthermore, the interface of the information inquiry tool (2100) can display the history of user's brush input (FF) on the object model.

In FIG. 14, the tools for downloading, uploading, and sharing the observation information at the corresponding time point may also be displayed (GG) in the interface. That is, the interface provided in the method of this invention enables the user not only simply to inquire the past information, but also to directly download the corresponding observation information to the user terminal, or to upload it to the service server (at this time, the upload can be made only when the observation information is stored on the user terminal), or to share the observation information with other users (general users, external expert users, etc.).

In FIG. 14, the sliding bar (AA) and the sliding icon (BB) have been described as tools for searching for the observation information accumulated in the past. However, these user interface tools may be modified into other forms as needed. For example, it can provide the dial tool instead of the sliding bar (AA) to help the user more easily search for the information. The sliding bar (AA) may have difficulties in operating when the scales are densely formed due to the accumulation of the observation information. To solve this problem, a dial-type tool may be provided independently or in parallel. In particular, in case that the dial tool is provided in parallel in addition to the sliding bar (AA), the sliding icon (BB) moves on the sliding bar (AA) whenever the user turns the dial.

On the other hand, in FIGS. 9 to 14, the interface can allow the user to deactivate the function for rotating the screen while dragging it with one finger, but instead activate the functions for rotating the screen by dragging it with three fingers while touching the touch-sensitive screen, for reducing/enlarging the screen when two fingers are pinched in/pinched out while touching the screen, and for moving the screen horizontally when two fingers are dragged while touching the screen. Here, the function to rotate the screen with one finger dragging is deactivated, because it may be confused with other functions. In FIGS. 9 to 14, there are many menus in which a touch input is performed with one finger. Therefore, it is to prevent the discomfort situation that the object gets rotated instead of the correct input.

Figure 15:
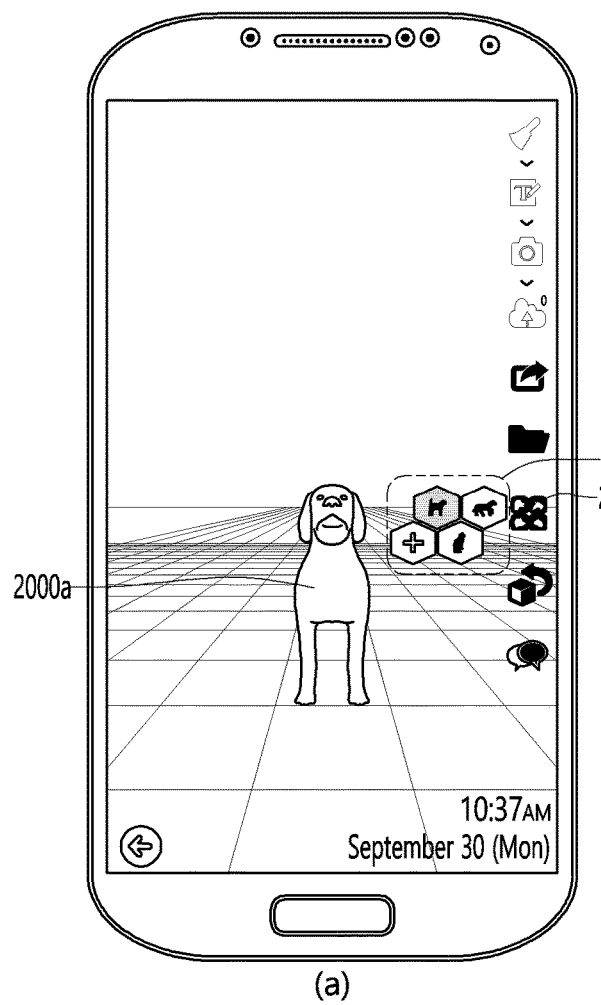
FIG. 15(a) and FIG. 15(b) are for explaining the function of changing, selecting, and adding an object, or more precisely, an object model.
Figure 15:
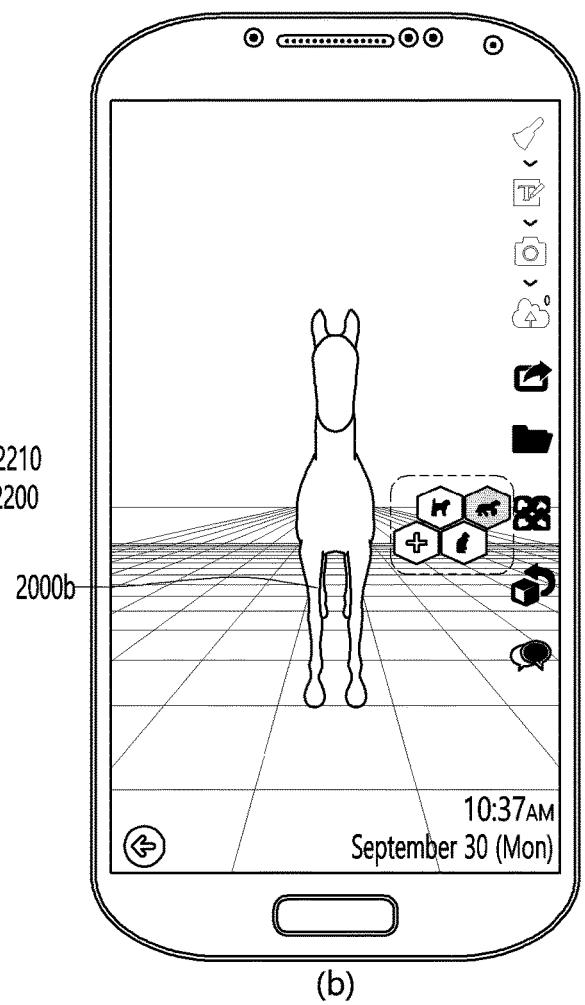

FIG. 15 is for explaining the function of changing/selecting or adding an object. As shown in FIG. 15, the tool for loading the interface for changing/selecting and adding an object (2200) can be located on the right side of the screen. When this is clicked, the user interface provides the menu (2210) for changing/selecting or adding an object, more precisely an object model. The corresponding menu (2210) can have the list of pre-stored object models and a button for adding a new object model. The list of object models may be expressed with pictures and brief texts so as to identify the species of the object model, but may be not necessarily limited thereto. In FIG. 15, there are hexagonal buttons, each of which includes the pictures and the texts for identifying the species of the object model. FIG. 15 (a) shows the screen before changing the object model and (b) after changing it. In the menu (2210) before the change, the hexagon button corresponding to the dog is colored (green).

After the change, the button corresponding to the horse is colored so that the user can easily recognize which object is currently selected.

*[Observation Information Sharing Step]

Up to now, the tools and the user interfaces for inputting and inquiring the observation information have been explained. Hereinafter, the step for sharing the entered observation information with other users (step S204 in FIG. 2) and the user interface provided in this step are described.

In the system of this invention, the user can enter the observation information on a pet animal and store or upload it to make a database of the observation information in the service server (200), With the service server (200), the user can also send the observation information to the outside terminal of experts such as veterinarians, acquaintance or others with similar experiences who need the information. By sharing it with them, the user can obtain some veterinary advice on the pet animal from them. Meanwhile, the veterinarians can utilize the observational information stored in the database for research or development, mapping the persons with similar experiences beyond time and space. At this time, the sharing of information means that, under the agreement of the user that the information entered by him/her can be disclosed to others, the service server (200) is allowed to access to other restricted or unrestricted users. Such access allowance can be made in various forms. For example, other users who logged-in to the service server (200) can directly search for the observation information or those who paid the service fee for database collection in advance can be periodically provided with updated observation information.

Meanwhile, a large amount of observation information uploaded to the service server (200) may be subjected to big data analysis. For example, the data on the body parts and symptoms of the pet animal in the observation information or the prescription text analog with the text and photo (video) inputs stating how symptoms have improved over time, etc. can be the subjects of big data analysis. With the data, experts can determine what kind of prescription or treatment is effective for specific diseases or traumas that have occurred in pet animals. In particular, when such observational information is collected globally and used as a source for big data analysis, it can provide an environment in which the treatments and the folk remedies that have not been formally accepted in the veterinary world can be publicly disclosed. Machine learning and AI technology can be applied to the big data analysis mentioned above. It can also include the process of identifying the symptoms of pet animals from the observation information entered by the users, the process of tracing the cause of each symptom's improvement (what prescription was given and treated, or what folk remedies were used for treatment, etc.), and the process of determining whether the above causes had a causal relationship in the improvement of the pet animal's symptoms (when a specific prescription or folk remedy turned out to have been effective in symptom improvement at a ratio of significant numerical values, it is considered to have the causal relationship). The same can be applied to users, i.e. humans, who care the pets as well. Regardless of whether the person or pet animal was treated or prescribed with the remedies intended for different objects or not, it is expected to contribute to the discovery of effective treatments for humans or pet animals.

While the service server (200) has the function of performing big data analysis on the uploaded observation information as described above, it also has the function, as shown in FIG. 16, of providing an environment where communication can take place by connecting them in the chatting way between users and external experts.

Figure 16:
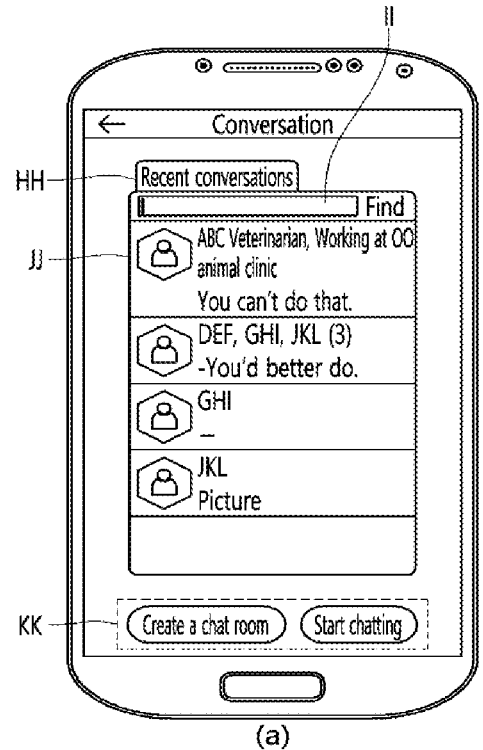
FIG. 16(a), FIG. 16(b) and FIG. 16(c) are for explaining the chat function provided in the method according to this invention.
Figure 16:
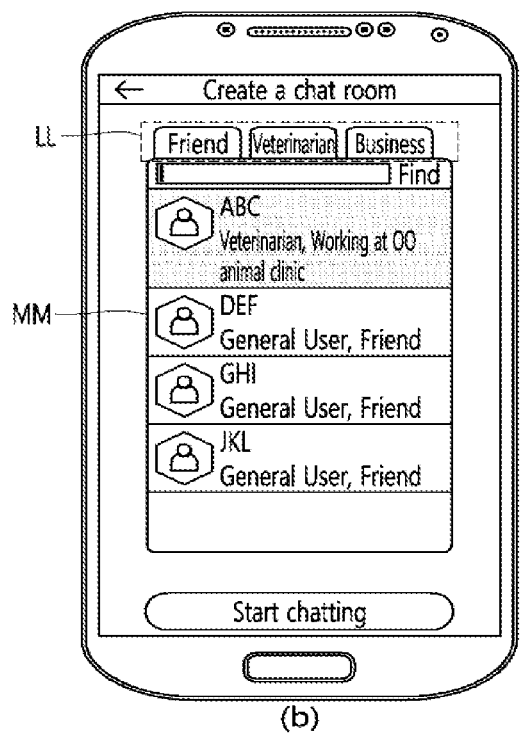
Figure 16:
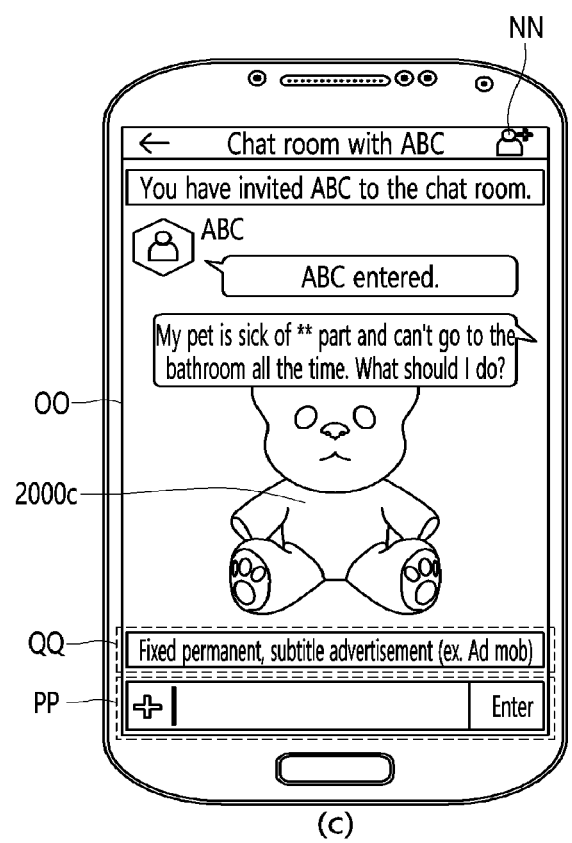

FIG. 16 (*a*) shows an example of the interface displayed when the user clicks the chat start tool (2050 in FIG. 8). The relevant user interface shows a recent conversation list. Specifically, the user interface of FIG. 16 (*a*) can include the screen indicating a list of recent conversations (H H), the search tool that allows keyword input to find a chatting room (II), the chat room list (JJ), and the manipulation tool including the chat room creation or conversation buttons (KK). Next, FIG. 16 (*b*) shows an example of another user interface, which can include the tab conversion menu (LL) that allows tab conversion between the friend list, the veterinarian list, and the business object list. If any tab is selected, the list for the corresponding tab (MM) can be displayed. Next, FIG. 16 (*c*) shows the user interface where a chatting is started after entering the chat room. It can include the button for adding a chatting partner (NN), the main window providing the basic chat function (OO), the input window for entering the dialogue for chatting (PP), and the advertisement window (QQ).

A feature of the user interface provided in this invention is that, when the user chats with an external expert, the pet animal or the object model can be displayed in the background. As shown in FIG. 16(*c*), an object model (2000*c*) is displayed in the main window (OO) as the background in which the conversation between the parties is taking place. In order to maintain such a chatting environment, it can display various marks for conversation transparently in the main window (OO). For example, the chatting input of each party can be displayed as the text in a speech bubble having a transparent background as shown in the drawing. Here, the text can also be displayed in a color having an arbitrary transparency, so that the object model (2000*c*) in the background is more visible in the main window (OO). It is recommended that the object model (2000*c*) displayed in the main window (OO) should be the model in the observation information entered by the user in relation to his/her pet animal. In this case, the object model (2000*c*) used as a background can be displayed along with brush input, text input and photo/video input, so that the user or an external expert can access it.

As mentioned earlier, the user interface can include an advertisement window (QQ) in it. At this time, the contents displayed on the advertisement window (QQ) may be a combination of text, image, and video. The advertisement displayed in the advertisement window (QQ) may be arbitrarily displayed by the operator (service operator) of the service server (200) after receiving a fee of a certain amount from the business object. Or it may be the one that the operator has analyzed the content of the conversation in the above chatting room and select to display the product or service that is expected to be of the highest interest to the user. For example, if it is determined that a conversation about the torn skin of a pet animal is going on between the user and the veterinarian in the chatting room and, more specifically, some keywords that may appear in the process of seeking advice for recovering the torn skin of the pet animal have been captured in the conversation, the advertisement for an ointment that can be applied to wound healing or for a specialized veterinary clinic that treats these types of wounds may be displayed in the corresponding advertisement window (QQ).

FIG. 17 is an example of the user interface displayed on the other party's terminal receiving the conversation invitation from the user when using the chatting function. When a general user invites an external expert (veterinarian) as a conversation partner, the terminal of external expert (veterinarian) is shown as the picture in the interface.

In FIG. 17 (a), a message (RR) about the invitation from someone can be displayed on the external expert terminal, which is expressed as a push alarm message (SS) on the application icon. In FIG. 17 (b), the interface can show how many chat messages from the other party remain unread (TT).

Figure 18:
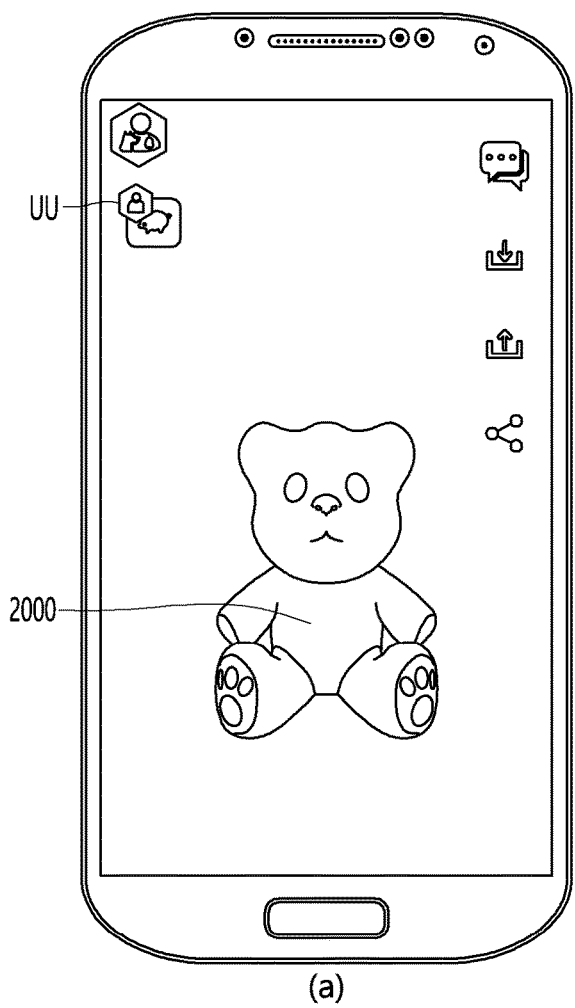
FIG. 18(a) and FIG. 18(b) show the state in which the observation information is downloaded while using the chatting function.
Figure 18:
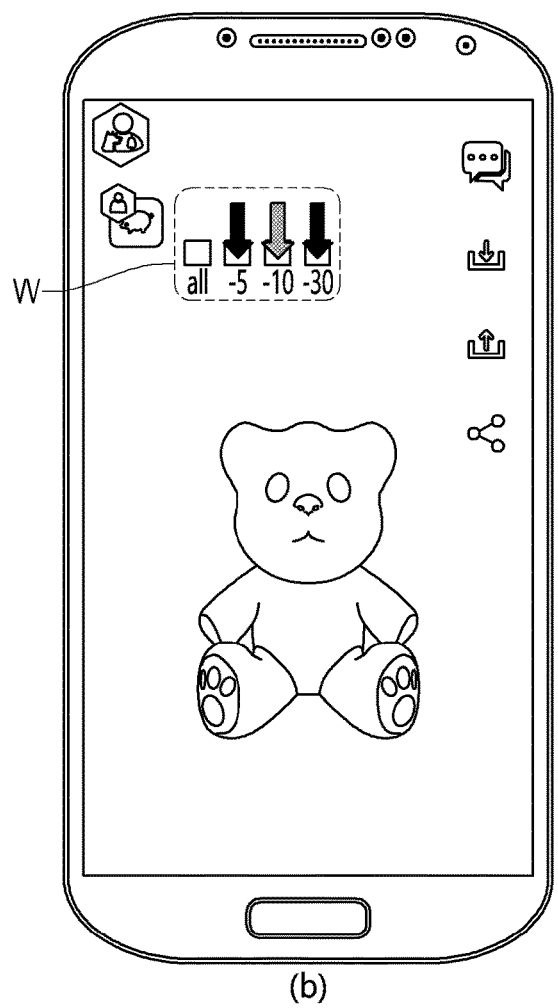

FIG. 18 shows a state in which the observation information is downloaded while using a chatting function. When a general user downloads the observation information that he/she has uploaded on the service server (200) again, or when an external expert downloads the observation information uploaded by the general user from the service server (200) to share the corresponding observation, the interface shown in FIG. 18 can be displayed.

FIG. 18 (a) is the view in which a list of pet animals registered by a general user is displayed (UU). If a plurality of pet animals has been registered, the screen will show a plurality of icons—at this time, the icons will have different shape to distinguish the species of pet animals. On the screen, more object models for the selected pet animal may also be displayed (2000).

FIG. 18 (b) shows an example of user interface through which the user can check the data downloaded from the service server (200). Here, the observation information previously stored in the memory in the user device looks white (observation information on −10th day), and the newly downloaded observation information is displayed in blue (observation information on −5th and −30 days).

Up to now, the interface for chatting has been explained.

In the observation information inputting and sharing service for the object according to this invention, only one object model but also multiple heterogeneous object models can be loaded together.

Figure 19:
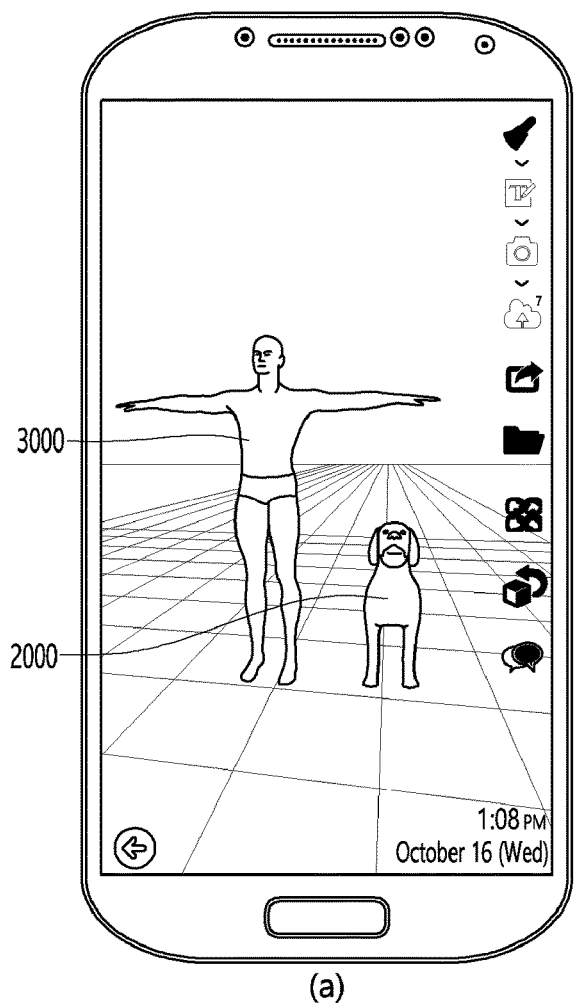
FIG. 19(a) and FIG. 19(b) show an example in which two different object models are simultaneously loaded.
Figure 19:
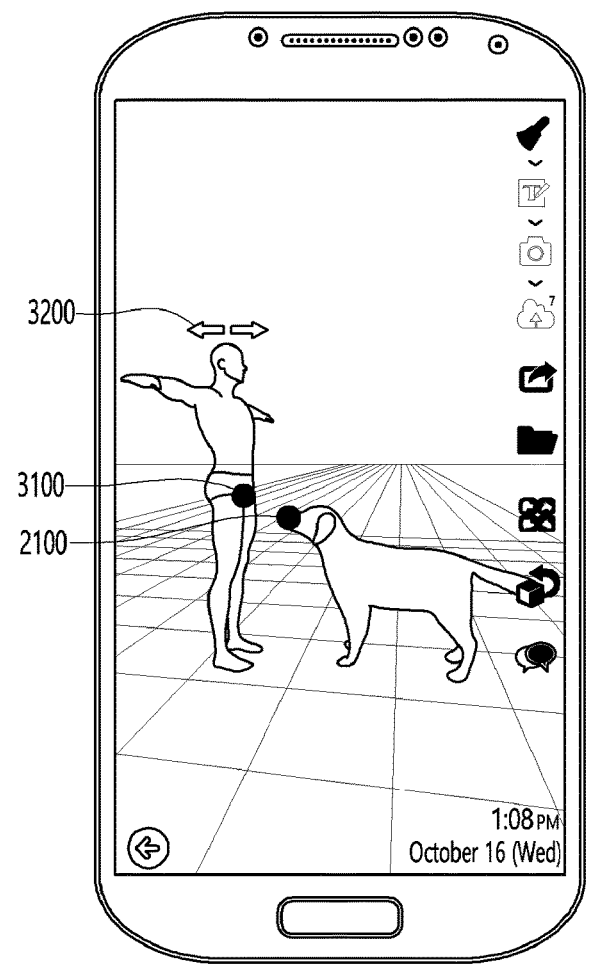

FIG. 19 shows an example in which the object model of a dog (2000) and that of a human (3000) are simultaneously loaded in one screen (FIG. 19(a)). Thus, the user interface of this invention can allow heterogeneous object models to be simultaneously loaded together. That is, it can provide the environment in which the observation information can be recorded even for heterogeneous object models. Such observation information on heterogeneous object models can help the user or an external expert to check what kind of relationship the different objects have with each other or what kind of influence they have on each other. When these observations are accumulated and analyzed, it may be possible to establish a systematic theory about the mutual influence between heterogeneous objects.

Recently, as the interests get increased in various events discovered while a pet and its owner live in the same space or in the sympathy between the two, a lot of researches on the relationship between them are being conducted. For example, a specially selected or common dog is made to smell a sample of diseases in each person with lung, breast, rectal cancer or diabetes. And the dog is trained to stop, sit, bark, stare or do other peculiar behavior at discovering such diseases. After then, the dog is taken to several random people or her owner to perform a disease detection behavior after sniffing their respiratory part, breast, urine or internal organs. The characteristic disease detection behavior of the dog can reveal which person has which disease. It has been reported that the dogs with the ability to discriminate the diseases early, that is, within the golden time, were very useful for treatment. It is now known that dogs can recognize these disease situations and behave differently than usual. As there are actual examples that various trained drug detection dogs have been operating at airports for a long time, the disease detection dogs are very plausible applications.

This invention allows the observation information to be collected on heterogeneous objects by providing a user interface, as shown in FIG. 19 that can more extensively and systematically observe the above relationships between a human (owner) and a pet animal (dog).

In FIG. 19 (b), the user can record on what circumstances and what relationship the heterogeneous objects are in by applying the brush input tool described above. FIG. 19 (b) describes the animal object model (2000) that smells the urine of the human object model (3000). In order to display this, the user can make the yellow brush input (3100) on the the genital area of human model (3000) by using the marker (M) and make the yellow brush input (2100) on the nose of the animal model (2000) as well. In FIG. 19, the brush inputs displayed on the human object model and the animal model can be the parts related to each other. The user can change the color of the brush input to show the severity of the abnormality. For example, when the color of human urine is red, the user can use the red brush input on the genital part of the human object model (3000). In response to it, if the pet animal smells the genital part of the person very actively, the user may indicate that the level of action is very active by inputting the red brush to the nose of the animal model (2000) as well. In addition to the diabetes, it can also be applied to other urinary system diseases or prostate cancer. The above-mentioned case is merely an example and there is no limitation on the type of object model and the situation in which the brush input is placed.

In FIG. 19 (b), the human object model (3200) has been rotated compared to the one in FIG. 19 (a). In the user interface of this invention, the object model can be freely rotated by the user's dragging input after clicking on the object model. In this process, a button such as diagram number 3200 may be further provided.

Figure 20:
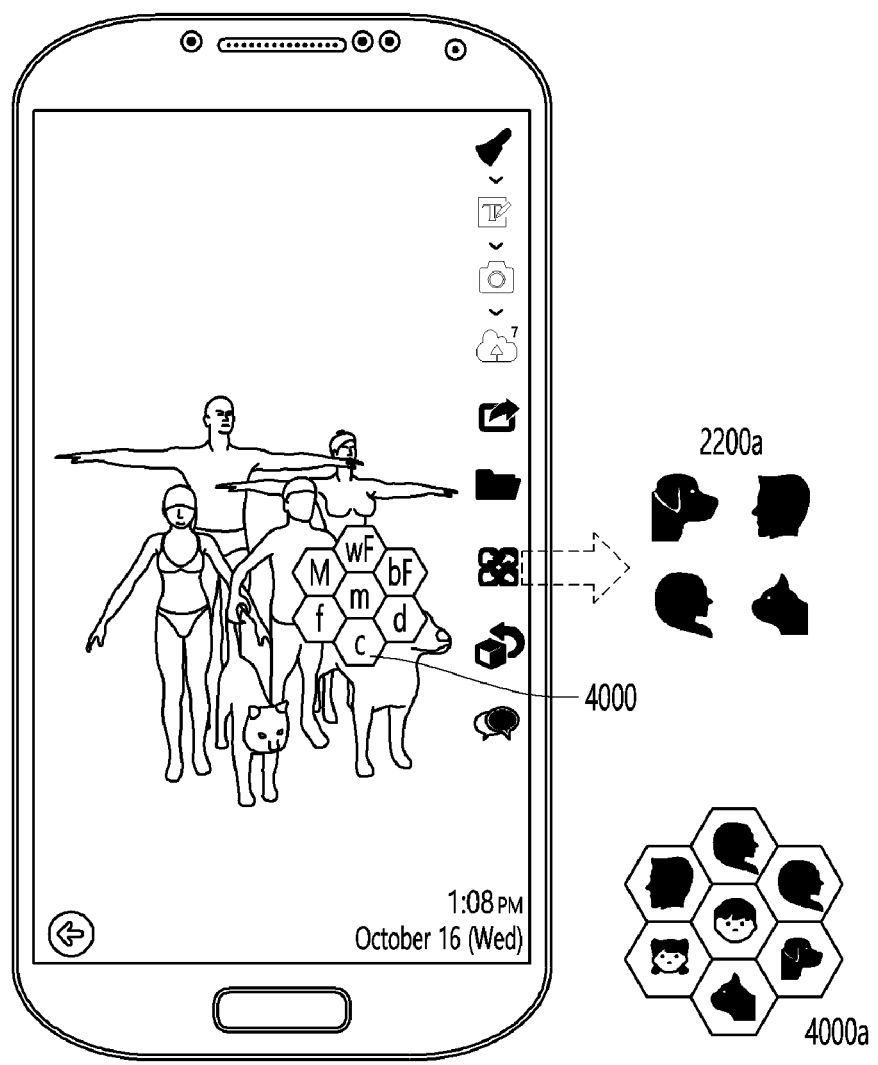
FIG. 20 shows an example in which a plurality of different object models are arranged.

FIG. 20 is an extension of the previous example in which heterogeneous object models are loaded and displayed together on one screen. In the user interface provided by this invention, one whole family raising several types of pet animals may be loaded, as shown in FIG. 20. In such an example, it is possible to generate the observation information that can comprehensively grasp the mutual relationship between heterogeneous objects. That is, the observation information between human object model 1 (father) and animal object model 1 (dog), the observation information between human object model 2 (mother) and animal object model 2 (cat), etc. can be recorded in the same manner as described above. In the user interface of FIG. 20, the user can select an arbitrary object model and then a next model to determine the heterogeneous objects to input the observation information, allowing only the selected object models to be displayed on the screen, the user can make the input state as shown in FIG. 19. Furthermore, in FIG. 20, the user interface can include a tool for adding the object models (4000) on it. The tool for adding the object models (4000) may be displayed in the same arrangement as the object models are arranged on the actual screen, as shown in FIG. 20. On the other hand, the tool for adding the object models may be displayed as an icon shape that can be easily recognized by the user, such as 4000a. And the tool for changing/selecting/adding an object among the tools arranged on the right side of the screen may be displayed in the form including heterogeneous objects as picture number 2200a.

Up to now, with reference to FIGS. 19 and 20, an example in which the observation information is entered for multiple heterogeneous objects on the user interface provided by this invention has been described.

In the descriptions so far, the examples in which various inputs are made in the 3D modeling state have been described. In FIGS. 7 to 9, it has been described that the marker (M) can be added on the object 3D model (2000), and that a brush input can be made at the point where the marker (M) is located.

Meanwhile, in the method of this invention, the information input on the 3D object model can be converted into the 2D information and stored or utilized as the data for analysis. It can also be shared with external parties such as experts and R&D developers. For the image data processing, the simplified 2D image data have much greater advantage in terms of work efficiency than the complex 3D image data. In particular, in terms of data processing speed, 2D data can be very advantageous. In this invention, it is possible to convert the input data entered by the user from 3D to 2D object model, improving the performance in terms of data processing speed and efficiency of analysis. When the observation information is accumulated and stored after being converted into 2D image data in this way, it is expected that the efficiency will be greatly improved, especially in performing big data analysis. As will be described later, this invention can provide the conversion to a standard 2D model of a predetermined size, with which it will be possible to easily compare the standardized models for many different types of objects or species, and to make various discoveries from the observational information that have been difficult to grasp in the past.

Figure 21:
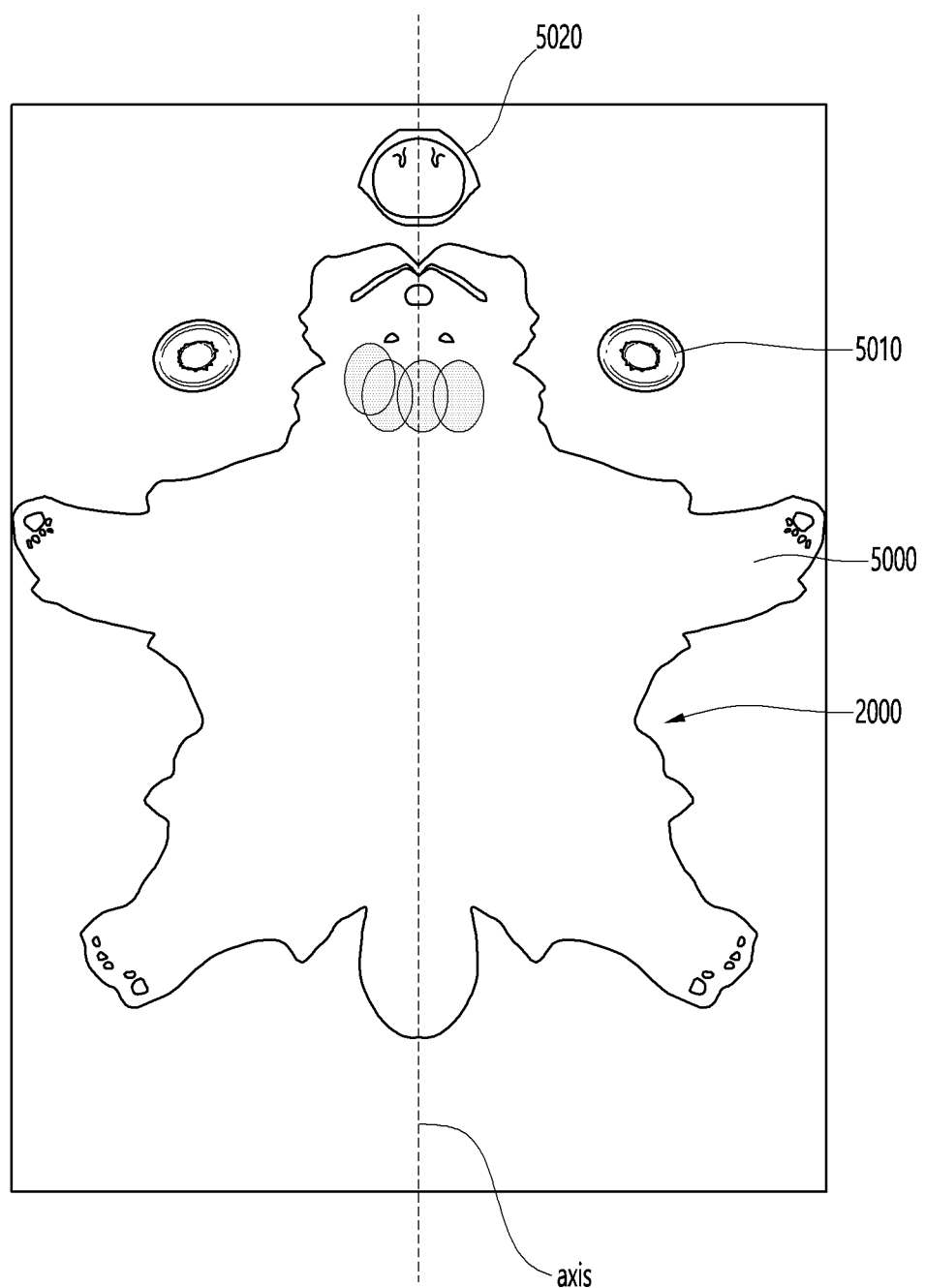
FIG. 21 illustrates a state in which a 3D object model is converted into a 2D model.

FIG. 21 illustrates the conversion of 3D object models (2000) in FIGS. 7 and 9 into 2D object models. As shown in FIG. 21, the object model can be spread out on both sides around one axis. On the other hand, when the 2D object model is displayed on the plane, it may be displayed in several parts. For example, as shown in FIG. 21, it can be divided into the body of object (5000), the eye of object (5010), and the nose of object (5020). In FIG. 9, a brush input is performed on the forehead of the object model (2000), as described above, but such brush input may also be displayed at the same position on the 2D object model. For this conversion into 2D model, it must be premised that each coordinate on the surface of the 3D object model corresponds to each on the 2D model, and that the eyes and nose on the 3D object model also correspond to those on the 2D model.

The 2D object model as shown in FIG. 21 can be provided together when the 3D object models of FIGS. 7 to 9 are provided. For example, the user interface can have a button to switch between the 2D and the 3D object models on the screen. By clicking this button, a user who has difficulty in manipulation, such as moving the marker on the 3D object model can change the 3D model into the 2D model to increase the convenience in moving the marker or making the brush input.

Furthermore, in the method of this invention, the 2D object model can be converted into the standard 2D object model (hereinafter, standard 2D object model), so that even different species can be expressed as the same or at least similar standard model. For example, the pet dogs can have various sizes and lengths of body parts (eg, legs). So, when the object model inputs for several dogs are received from several users, the 2D models of different sizes may be collected, nullifying the efforts to reduce the data processing burden while converting the 2D image. In order to solve this problem, this invention allows the object models of diverse sizes to be converted into a standard model in order to facilitate the data processing such as image comparison even when the observation information for 2D object models of different sizes have been collected.

Figure 22:
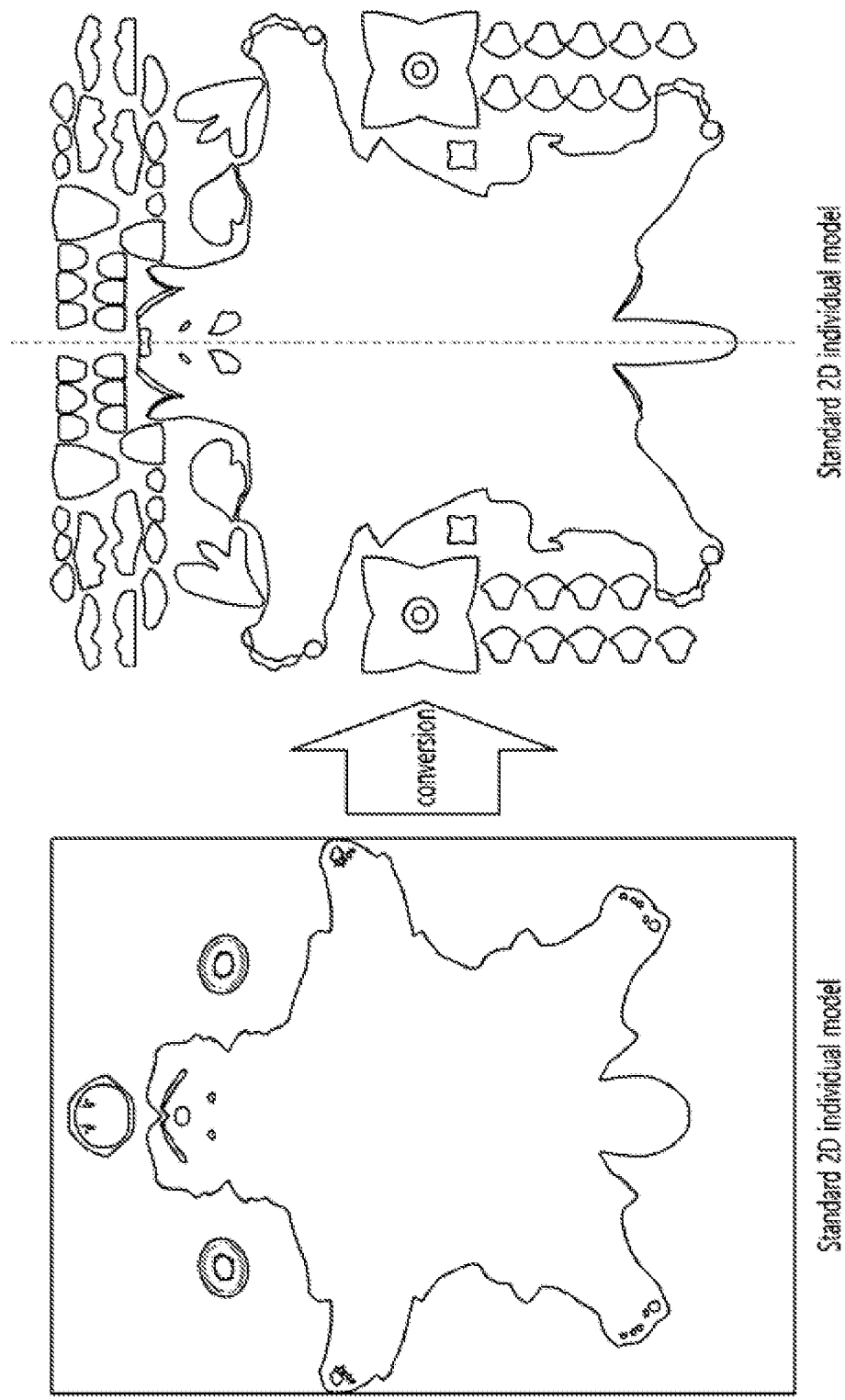
FIG. 22 is illustrates a state in which a 2D object model is converted back to the standard 3D model.

FIG. 22 shows how a 2D object model is converted into the standard 2D model. In the standard 2D object model, a plurality of parameters for displaying the object model has been determined in advance. For example, the position of the axis is fixed and each part (eyes, nose, teeth, claws, etc.) constituting the object is arranged along the axis. Thus, it means the map model for analysis of body where the diverse parameters are arranged at the standardized positions. When a small object is converted into a standard 2D model, the size of the object can be expanded till the converted size becomes closest to the standard 2D object model. However, in this case, it is desirable to maintain the ratio of the object (e.g., the ratio of the length of the legs to the body, the ratio of the length of the nose to the body, etc.). If the conversion to the standard 2D object model is actively used in this way, even when the observation information is collected for objects of different body sizes, the burden of data processing for mutual comparison will be much reduced and more new information will be able to obtain from the big data analysis of the observation information.

Up to now, a method for providing the observation information inputting and sharing service on an object as well as a storage medium for executing such a method have been examined. This invention is not limited to specific practices and applications described above. Without deviating from the gist of the invention as claimed in the claims, its applications can be variously modifiable by those of ordinary skill in the field to which this invention pertains. Such modifications shall not be distinguished from the technical idea or vision of this invention.

The invention claimed is:

1. A method of providing an observation information input and sharing services for an arbitrary object, wherein the method comprises:
 (a) a stage of receiving a member information from a user;
 (b) a stage of loading a 3D object model corresponding to the member information of the user;
 (c) a stage of receiving an observation information on the 3D object model through a first user interface provided in a state wherein the 3D mentioned object model is loaded; and
 (d) a stage of sharing the received observation information to other user terminals through a network;
 wherein,
 step (b) includes loading a plurality of object models, wherein at least two object models among the plurality of object models are different from each other,
 step (c) includes receiving a first observation information on a first object model among the object models and receiving a second observation information on a second object model different from the plurality of object models, wherein the first object model and the second object model are different from each other, and
 the second observation information corresponds to the first observation information, and the second observation information and the first observation information are for identifying a mutual relationship between the different object models.

2. The method according to claim 1,
 wherein the first user interface includes a plurality of observation information input tools for inputting the observation information, wherein the above-mentioned observation information input tools include:

a brush input tool capable of inputting at least one color on the above-mentioned object model;

a text input tool capable of inputting text for the above-mentioned object model;

a photographing input tool capable of inputting a photo or video of an object corresponding to the above-mentioned object model; and a storage and upload tool for storing and uploading the input observation information, wherein the above-mentioned brush input tool, text input tool, photographing input tool, and storage and upload tool are characterized in that the above-mentioned tools are arranged in the order in one direction.

3. The method according to claim 2, wherein the brush input tool includes:

a first menu set including a menu for selecting a brush size, an input initialization menu, an input rescinding menu, a next step menu, and a menu for selecting a color; and a second menu set including a menu for inputting a mood level and an activity level of the abovementioned object, wherein the method of providing the observation information inputting and sharing services for an arbitrary object is characterized in that the above-mentioned first menu set is preferentially displayed when the above-mentioned brush input tool is selected by the user and the second menu set is displayed when a next step progress menu is selected among the above-mentioned first menu set and the first menu set is not displayed when the second menu set is displayed.

4. The method according to claim 3, wherein the method is characterized in that the brush input tool, text input tool, photographing input tool, and storage and upload tool are arranged in a downward direction along the left or right side in the screen of the user terminal and in that a menu set or menus corresponding to each of the above-mentioned input tools are displayed from the same height as the respective input tools.

5. The method according to claim 4, wherein the method is characterized in that the above-mentioned first user interface further includes an information inquiry tool for inquiring accumulated observation information in chronological order and in that when the above-mentioned information inquiry tool is selected by the user, an information search tool in the form of a slide for searching for observation information accumulated from the past to the present is displayed.

6. The method according to claim 5, wherein the method which is characterized in that the above-mentioned first user interface further includes a tool for changing, selecting, or adding an object.

7. The method according to claim 6, wherein the above-mentioned first user interface further includes a chat initiation tool for executing the chat function and is characterized in that when the above-mentioned chat initiation tool is selected by the user, a chat room is displayed to invite an external expert to share observation information and receive the opinion of the above-mentioned external expert based on the above-mentioned observation information.

8. The method according to claim 1, wherein the method is characterized in that after step (c), the method further comprises a stage converting the 3D object model into which the observation information is input to a 2D object model.

9. A non-transitory computer-readable storage medium which stores instructions for performing a method of providing the observation information inputting and sharing service for an arbitrary object, wherein the method comprises:

(a) a stage of receiving member information from the user;

(b) a stage of loading a 3D object model corresponding to the member information of the user;

(c) a stage of receiving the observation information on the object model through a first user interface provided in the state in which the object model is loaded; and (d) a stage of sharing the received observation information to other user terminals through a network, wherein step (b) includes loading a plurality of object models, where at least two object models among the plurality of object models are different from each other, wherein step (c) includes receiving a first observation information on a first object model among the object models; and receiving a second observation information on a second object model different from the plurality of object models where the first object model and the second object model are different from each other; and wherein the second observation information corresponds to the first observation information, and the second observation information and the first observation information are for identifying a mutual relationship between the different object models.

* * * * *